United States Patent
Bajaj et al.

(10) Patent No.: US 11,403,024 B2
(45) Date of Patent: Aug. 2, 2022

(54) EFFICIENT RESTORATION OF CONTENT

(71) Applicant: Cohesity, Inc., San Jose, CA (US)

(72) Inventors: Rupesh Bajaj, Dewas (IN); Prajakta Ayachit, Maharashtra (IN); Apurv Gupta, Bangalore (IN); Janga Varun, Bangalore (IN); Markose Thomas, San Jose, CA (US); Zheng Cai, Cupertino, CA (US); Igor Korsunsky, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/943,680

(22) Filed: Jul. 30, 2020

(65) Prior Publication Data

US 2021/0064264 A1    Mar. 4, 2021

Related U.S. Application Data

(60) Provisional application No. 62/892,931, filed on Aug. 28, 2019.

(51) Int. Cl.
*G06F 12/00* (2006.01)
*G06F 13/00* (2006.01)
*G06F 3/06* (2006.01)

(52) U.S. Cl.
CPC .......... *G06F 3/0647* (2013.01); *G06F 3/0619* (2013.01); *G06F 3/0673* (2013.01)

(58) Field of Classification Search
CPC ..... G06F 3/0647; G06F 3/0619; G06F 3/0673
USPC ......................................................... 711/165
See application file for complete search history.

(56) References Cited

U.S. PATENT DOCUMENTS

| | | | | |
|---|---|---|---|---|
| 4,549,265 A * | 10/1985 | Deckers | ................ | G06T 11/006 250/363.02 |
| 5,390,318 A * | 2/1995 | Ramakrishnan | ...... | G06F 16/902 711/158 |
| 5,537,592 A * | 7/1996 | King | ..................... | G06F 3/0601 707/756 |
| 5,956,733 A * | 9/1999 | Nakano | ................. | G06F 16/113 |
| 6,081,814 A * | 6/2000 | Mangat | ................. | G06F 16/958 715/205 |
| 6,453,334 B1 * | 9/2002 | Vinson | ................... | G06F 9/445 709/203 |
| 6,847,995 B1 * | 1/2005 | Hubbard | ................ | G06Q 30/02 380/255 |
| 7,065,549 B2 * | 6/2006 | Sun | ......................... | H04L 29/06 709/201 |
| 7,685,460 B1 * | 3/2010 | Bingham | ............ | G06F 11/1469 714/6.11 |
| 7,725,428 B1 * | 5/2010 | Hawkins | ................. | G06F 16/27 |
| 8,332,442 B1 * | 12/2012 | Greene | ............... | G06F 11/1469 707/828 |

(Continued)

*Primary Examiner* — Sheng Jen Tsai
(74) *Attorney, Agent, or Firm* — Van Pelt, Yi & James LLP

(57) ABSTRACT

A technique for restoring content is described. The technique includes receiving a specification of content to be restored to a target storage from a data source. The technique also includes determining task units to be performed to restore the specified content. Each task unit is associated with a corresponding assigned weight value. Based on the corresponding assigned weight values, the task units are distributed to different task groups. The task groups are processed in parallel with each other to concurrently perform at least a portion of the distributed task units.

15 Claims, 13 Drawing Sheets

(56) References Cited

U.S. PATENT DOCUMENTS

| | | | | |
|---|---|---|---|---|
| 9,223,843 B1* | 12/2015 | Madhavarapu | ....... | G06F 16/273 |
| 9,384,200 B1* | 7/2016 | Batchu | ............... | G06F 11/1464 |
| 9,658,911 B2* | 5/2017 | Resch | ............... | G06F 11/0757 |
| 10,684,924 B2* | 6/2020 | Kilaru | ............... | G06F 11/2094 |
| 10,719,554 B1* | 7/2020 | Davis | ............... | G06F 16/2365 |
| 2001/0029441 A1* | 10/2001 | Hachiya | ............... | G06F 17/12 |
| | | | | 703/2 |
| 2003/0033543 A1* | 2/2003 | Hubbard | ............ | G06Q 30/0212 |
| | | | | 726/4 |
| 2004/0148336 A1* | 7/2004 | Hubbard | ............... | G06Q 10/06 |
| | | | | 709/202 |
| 2004/0205377 A1* | 10/2004 | Nakamura | ......... | G06F 11/1494 |
| | | | | 714/4.5 |
| 2005/0256610 A1* | 11/2005 | Orita | ................... | G05D 1/0251 |
| | | | | 700/248 |
| 2006/0224560 A1* | 10/2006 | Makita | ............... | G06F 11/1092 |
| 2006/0287890 A1* | 12/2006 | Stead | ................... | G16H 40/67 |
| | | | | 705/3 |
| 2009/0254572 A1* | 10/2009 | Redlich | ................. | G06Q 10/06 |
| 2010/0149175 A1* | 6/2010 | Tan | ..................... | H04N 9/8227 |
| | | | | 345/419 |
| 2011/0107026 A1* | 5/2011 | Quigley | ............. | G06F 21/6272 |
| | | | | 711/114 |
| 2011/0112880 A1* | 5/2011 | Ryan | ............... | G06Q 10/06311 |
| | | | | 705/7.12 |
| 2012/0331088 A1* | 12/2012 | O'Hare | ............... | G06F 21/6227 |
| | | | | 709/214 |
| 2013/0339407 A1* | 12/2013 | Sharpe | ............... | G06F 16/1752 |
| | | | | 707/827 |
| 2014/0006354 A1* | 1/2014 | Parkison | ................ | G06F 3/067 |
| | | | | 707/649 |
| 2014/0006357 A1* | 1/2014 | Davis | ................... | G06F 16/182 |
| | | | | 707/667 |
| 2014/0006465 A1* | 1/2014 | Davis | ................... | G06F 16/183 |
| | | | | 707/827 |
| 2014/0007239 A1* | 1/2014 | Sharpe | ................. | G06F 16/137 |
| | | | | 726/24 |
| 2014/0081919 A1* | 3/2014 | Matsumoto | ......... | G06F 11/1464 |
| | | | | 707/652 |
| 2014/0279900 A1* | 9/2014 | Gupta | ................... | G06F 16/219 |
| | | | | 707/634 |
| 2014/0279920 A1* | 9/2014 | Madhavarapu | ..... | G06F 16/2358 |
| | | | | 707/649 |
| 2014/0292335 A1* | 10/2014 | Kachi | ................... | G01R 33/246 |
| | | | | 324/309 |
| 2014/0317349 A1* | 10/2014 | Resch | ................. | H04L 67/1095 |
| | | | | 711/114 |
| 2015/0143343 A1* | 5/2015 | Weiss | ............... | G01R 31/31705 |
| | | | | 717/128 |
| 2015/0317441 A1* | 11/2015 | Lorman | ................ | G16H 40/20 |
| | | | | 705/3 |
| 2015/0363743 A1* | 12/2015 | Maetz | ............. | G06Q 10/06311 |
| | | | | 705/7.13 |
| 2016/0041887 A1* | 2/2016 | Davis | ................. | G06F 11/1076 |
| | | | | 714/6.2 |
| 2016/0063007 A1* | 3/2016 | Iwasaki | ............... | G06F 16/2228 |
| | | | | 707/645 |
| 2016/0171511 A1* | 6/2016 | Goel | ...................... | G06Q 50/01 |
| | | | | 705/7.29 |
| 2016/0350329 A1* | 12/2016 | Resch | ................... | G06F 3/0644 |
| 2017/0286707 A1* | 10/2017 | Eda | ...................... | G06F 16/1827 |
| 2018/0121453 A1* | 5/2018 | Jain | ................... | G06F 11/1448 |
| 2018/0121454 A1* | 5/2018 | Kushwah | ................ | G06F 16/13 |
| 2019/0236516 A1* | 8/2019 | Ponnusamy | ... | G06Q 10/063114 |
| 2020/0117547 A1* | 4/2020 | Danilov | .................. | G06F 3/067 |
| 2021/0191828 A1* | 6/2021 | Sawada | ................. | G06F 3/0689 |

\* cited by examiner

EFFICIENT RESTORATION OF CONTENT

CROSS REFERENCE TO OTHER APPLICATIONS

This application claims priority to U.S. Provisional Patent Application No. 62/892,931 entitled EFFICIENT RESTORATION OF CONTENT filed Aug. 28, 2019 which is incorporated herein by reference for all purposes.

BACKGROUND OF THE INVENTION

Often, file system data is desired to be backed up. For example, a primary storage system may store data for enterprise applications. A secondary storage may be used to provide backup, protection or other services for the primary storage system. Thus, data on the primary storage system may be backed up to the secondary storage system. Such a secondary storage system may store large amounts of data (e.g., terabytes, petabytes, etc.) desired to be available for long periods of time. At some later time, data that may no longer be available on the primary system may be desired to be restored. The data on the secondary storage may serve as a data source for restoring the desired data to the primary or other system.

BRIEF DESCRIPTION OF THE DRAWINGS

Various embodiments of the invention are disclosed in the following detailed description and the accompanying drawings.

DETAILED DESCRIPTION

Figure 1:
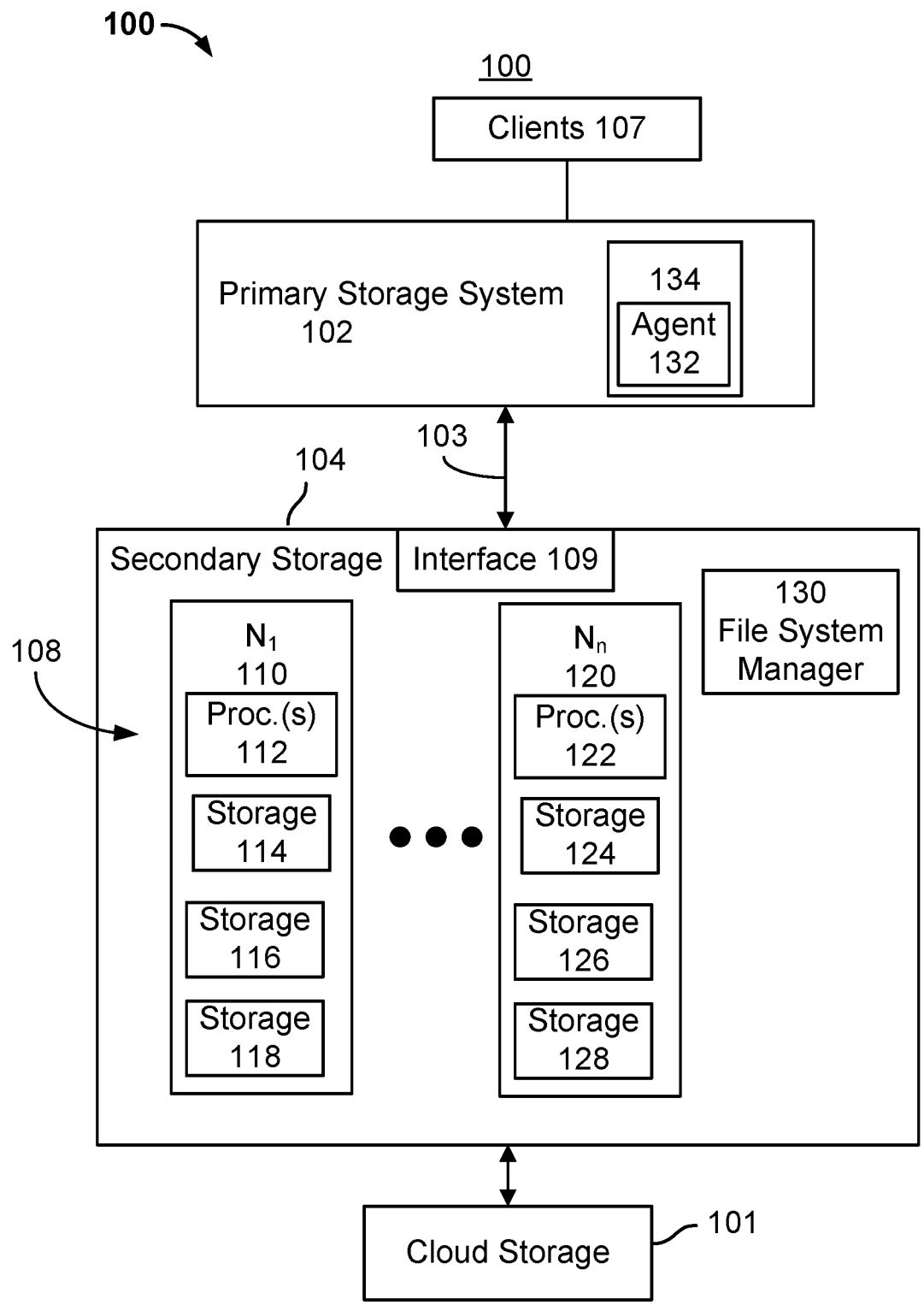
FIG. 1 is a block diagram illustrating an embodiment of a distributed storage system capable of performing efficient restore operations.

A secondary storage may include data backed up from a primary data storage system. The data on the secondary storage may be used to provide backup, protection or other services for the primary storage system. The secondary storage may act as a data source for restoring content to the primary storage system. Content includes directories and subdirectories (e.g. hierarchically organized directories) as well as data items such as files and emails (e.g. items that may be present in directories and subdirectories). The restoration might be to the original location on the primary storage system or to a different location. Backing up content can include backing up attributes of the content (such as the last modification time); restoring content can include restoring the backed up attributes of the content.

In the simplest case, the restore is to a target storage that is empty. However, other restore scenarios can be more complex, and several factors can affect the restore process. For example, when restoring to the same primary storage location the backup was taken from, changes made to the data stored in the primary storage since the backup was performed, such as added files, added directories, or other versions of the backed up content can complicate a restore. In some instances, the restore might require overwriting a file, merging the restored file with a different version of the file present in the target storage, skipping restoration of the file, performing other tasks, or combinations thereof. Even if the target storage is a new location (e.g. not the same as the primary storage location the backup was taken from), the target storage may include other content. Thus, a variety of disparate tasks are desired to be managed and performed for the restore. Further, large amounts of data may be desired to be restored. In some cases, for example, over a million files in a volume such as a network attached storage device might be desired to be restored. Restoration of such large amounts of data may consume large amounts of both time and computing resources. Consequently, the computing loads generated by the restore need to be efficiently managed. Accordingly, what would be useful is a mechanism for facilitating efficient restoration of content.

A mechanism for restoring content is described. A specification of content to be restored ("specified content") from a data source to a target storage is received. The specified content may include directories and data items such as files, symbolic links, hard links, and emails. For example, a user may select a directory, a volume such as a virtual machine and the contents therein, individual files, and/or other content to be restored. Task units to be performed to restore the specified content are determined. A task unit may include an operation or set of operations carried out as part of the restore process. For example, a task unit may be a file system operation including, but not limited to, creation of a directory, creation of a hard or symbolic link, creation of a file, writing an amount of data, setting the attributes for a file, and/or setting attributes for a directory. Each task unit may be associated with a corresponding assigned weight value. In some embodiments, the weight value for a task unit is based upon an estimated amount of time, computing resources (e.g. processing capacity), and/or other resources (e.g. network bandwidth) required to perform the task unit. Task units that take longer to complete and/or utilize more resources are generally assigned a higher weight than task units that require fewer resources and/or less time to complete. Based on the corresponding assigned weight values, the task units may be distributed to different task groups. Task units can be allocated to different task groups to attempt to generate task groups having approximately the same total weight. The task groups may be operated on in parallel with each other. For example, the task units in different task groups may be executed substantially in parallel. As a result, loads may be more evenly distributed, task units can be concurrently executed, and efficiency of restoring the specified content improved.

In some embodiments, specified content to undergo the restore process may be reduced by not restoring directories and/or data items (e.g. files) which are already present on the target storage. For example, it may be desirable to restore a directory and its contents to their original location on primary storage. The difference between the directory (and its contents) at the target storage and the directory (and its contents) corresponding to the data source may be determined. When the correct version of a data item is already present in the target directory, it is not necessary to restore that data item as part of the restore process. If the target directory has a version of a data item that is missing from or different than that data item on the data source, that data item is restored. In some embodiments, restoring a data item includes changing the portions of the data item on the target directory that are different from the data source. For example, contents, attributes, or both on the target directory may be updated or deleted. In some embodiments, a data item in the target directory is simply replaced by the corresponding data item from the data source. Thus, efficiency in restoring the specified content may be improved.

In some embodiments, the specified content to be restored includes directories and/or other items having a hierarchical order. For example, a directory may include one or more subdirectories. A parent directory is at a higher level in the hierarchy than its subdirectories. The directories may include subdirectories, data item(s), or both. Such data items may include but are not limited to files, symbolic links, hard links, emails and/or other items. In such embodiments, the task units may be performed in parallel to create and populate the directories. Populating a directory may include creating the data items in the directory (e.g. creating files), extracting the data (e.g. file contents) for the data item from the data source, writing the data (e.g. file contents) for the data item to the target storage, and restoring attributes by setting the attributes of the data items in the directory.

The directories may be created in the hierarchical order, with directories always created before their sub-directories. The directories may be populated after they are created. In some embodiments, population of directories in hierarchical order is enabled, but not enforced. In such embodiments, data items in a directory may, but need not, be created, have their data written into the target storage and/or have their attributes set before a subdirectory of the directory is populated; a directory's sub-directory may be fully or partially populated before all of the data items of the directory have been created, had their data written into the target storage and had their attributes set. In other embodiments, population of directories in hierarchical order is enforced. In such embodiments, data items in the directory are created, have their data written into the target storage and have their attributes (e.g. last modification time) set before a subdirectory of the directory is populated. In addition, the creation and population of directories may be carried out in parallel. For example, creation of a directory, populating the directory with data items and creating subdirectories of the directory may be broken into task units and the task units divided into groups as described above. At least some of the attributes for each directory are set in a reverse hierarchical order after all of its sub-directories have been created, populated, and had their attributes set. In some embodiments, all of the attributes for directories are set in reverse-hierarchical order. A directory may have hierarchically-based attributes (e.g. last modification time), which may change according to changes lower in the hierarchy (e.g. the creation, deletion, or update of a descendant file or sub-directory). A directory may have non-hierarchically-based attributes (i.e. attributes which are not hierarchically-based, such as the name of the directory), which are not sensitive or likely to change according to changes lower in the hierarchy (e.g. the creation, deletion, or update of a descendant file or sub-directory) and do not cause attributes of a parent or ancestor directory to change if they are changed. Thus, a subdirectory has at least some of its attributes (e.g. hierarchically-based attributes) set before the directory. In some embodiments, attributes which are not hierarchically-based may be set in another order. For example, such non-hierarchically-based attributes may be set when the directory is created. However, hierarchically-based attributes are set in reverse hierarchical order. In some embodiments, some or all of the attributes (which are to be restored) for each directory are stored in a persistent storage after each directory is created. This allows the attributes of a directory to be available later when some or all of the directory's attributes are set and may protect against failures. Setting of attributes in subdirectories may also be carried out in parallel for subdirectories with a common parent. Creating directories in hierarchical order, enabling the population of each directory after it is created and setting at least a directory's hierarchically-based attributes in reverse hierarchical order can greatly improve the efficiency of the restore process. Creating directories in hierarchical order means that parent directories are created before their subdirectories. Thus, the path to a subdirectory is created before the subdirectory itself. In contrast, if the attributes, such as the last modification time, for directories were also set in hierarchical order, then each time the attributes of a subdirectory were set, the attributes of the parent directory would be updated. This could result in the parent directory having an attribute such as the last modification time set to a value which reflects the time of the restoration, not the value preserved in the backup. In this case, restoring the proper attribute values might require setting some attributes multiple times, which would be disadvantageous. Instead, setting the hierarchically-based attributes or all of the attributes for the directories in reverse hierarchical order may obviate the need for updating the attributes of the directory multiple times. Consequently, efficiency of the restore may be improved. Further, parallelizing the creation and population of directories may further improve the efficiency of the restore.

Creating and populating a directory may include determining whether the complete directory path has already been created. Stated differently, creating and populating a directory may include determining whether all of the directory's ancestor or parent directories have been created. In some embodiments, making this determination simplifies management of task units which are performed in parallel. Performing task units in parallel creates the possibility that an attempt to perform a task unit that creates a data item might be executed before the task unit for creating the data item's directory is performed. In an embodiment, a directory's identifier is written to a cache after the directory is created. In this case, determining whether a directory has been created may be accomplished by searching the cache for an indication that the directory and/or its parents were created. If it is determined that the data item's complete directory path has not previously been created, then any directories remaining to be created in the complete directory path are created as part of the process of creating the data item. Furthermore, task units that create a directory can include task(s) for determining whether the complete directory path has been created. This prevents the task unit from attempting to create a directory if the directory has already been created. The directory may already have been created as part of the process of creating a data item within the directory. Thus, a task unit for creating a directory and task units for creating that directory's data items may be processed in parallel. The approach of performing task units in parallel, including determining whether directories have been created and then creating directories as necessary, is more efficient than creating all directories first and then populating them. The approach of creating all directories first and then populating them could significantly limit parallelism and greatly slow the restore process. Other solutions which include attempting to re-create directories that already exist, expend additional resources and may result in error conditions, requiring yet more resources to manage.

FIG. 1 is a block diagram of system 100 for managing a distributed storage system capable of performing efficient restoration of backup data. System 100 includes a primary storage system 102, secondary storage system 104 and cloud storage 101. Primary storage system 102 is a computing system that stores file system data. Primary storage system 102 may be comprised of one or more servers, one or more computing devices, one or more storage devices such as network attached storage (NAS) devices, and/or combinations thereof. Such devices may be accessed by clients 107. Also shown as part of primary storage system 102 is backup agent 132 residing on device 134. Device 134 may comprise a computing device, server, storage system or other storage or computing component of primary storage system 102.

Primary storage system 102 may be configured to backup file system data to secondary storage system 104 according to one or more backup policies. In some embodiments, backup agent 132 orchestrates a backup of primary system 102. In some embodiments, backup agent 132 may initiate a backup according to one or more backup policies. In some embodiments, a backup policy indicates that file system data for primary storage system 102 is to be backed up to cloud 101 and/or secondary storage system 104 on a periodic basis (e.g., hourly, daily, weekly, monthly, etc.). In other embodiments, a backup policy indicates that file system data is to be backed up to cloud 101 and/or secondary storage system 104 when a threshold amount of data has changed. In other embodiments, a backup policy indicates that file system data is to be backed up to cloud 101 and/or secondary storage system 104 in response to a command from a user associated with primary storage system 102 or a command from secondary storage system 104. In some embodiments, a backup may be orchestrated from or ingested by the secondary storage system 104 without requiring the use of a backup agent 132.

Secondary storage system 104 may receive and store the backup data from primary storage system 102. Secondary storage system 104 may store backup data across cluster 108 and/or archive the backup data to cloud storage system 101. Cloud storage system 101 may be a public cloud storage provider. Cloud storage system 101 is configured to receive and store an archive from secondary storage system 104.

Storage cluster 108 includes a plurality of storage nodes $N_1$ through $N_n$. In some embodiments, storage cluster 108 may store data for secondary storage services, primary storage services, or both. For example, storage cluster 108 may be part of secondary storage system such as secondary storage system 104 for one or more primary systems such as primary system 102. In such embodiments, storage cluster 108 is configured to back up and restore a plurality of files stored on primary system 102. In other embodiments, storage cluster 108 is configured to store and restore a plurality of files generated by an entity (e.g. a user, a system or an application) associated with storage cluster 108. In such embodiments, storage cluster 108 may provide primary storage services. In some embodiments, storage cluster 108 may initially be part of a secondary storage system, but be promoted to a role as a primary storage system for some or all resources (e.g. files) available to storage cluster 108. Further, although described in the context of a hardware cluster, storage cluster 108 may be implemented in another manner including but not limited to a virtual cluster in the cloud.

For simplicity, only storage nodes $N_1$ 110 and $N_n$ 120 are labeled and shown. Each storage node 110 through 120 of secondary storage system 104 may be comprised of one or more processors 112 and 122 and accompanying storage elements 114, 116 and 118 and 124, 126 and 128, respectively. Storage elements 114, 116, 118, 124, 126 and/or 128 may be solid state drives, one or more hard disk drives, or combinations thereof. Secondary storage system 104 may also include one or more processors coupled to the storage drives and configured to archive data stored in the storage drives to cloud storage system 101, an additional cluster (not shown), and/or one or more other storage mediums (e.g. tape, removable storage). Although a particular number of storage elements 114, 116, 118, 124, 126 and/or 128 are shown, another number may be used.

In some embodiments, secondary storage system 104 is configured to store the backup data in a tree data structure and to create different views of the tree data structure over time. A snapshot of a structure saves the state of the structure at the time the snapshot is captured. A backup snapshot is a snapshot of primary storage system 102 and may be used to back up primary storage system 102. A snapshot tree provides a view of the file system data corresponding to a backup snapshot. The tree data structure may be used to capture information related to different versions of snapshot trees. The tree data structure allows a chain of snapshot trees corresponding to different versions of backup snapshots (i.e., different snapshot tree versions) to be linked together by allowing a node of a later version of a snapshot tree to reference a node of a previous version of a snapshot tree (e.g., a "snapshot tree forest"). For example, a root node or an intermediate node of the second snapshot tree corresponding to the second backup snapshot may reference an intermediate node or leaf node of the first snapshot tree corresponding to a first backup snapshot.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, metadata associated with a data item that is less than or equal to a limit size (e.g., 256 kB), data associated with a data item (e.g., data fragment) that is less than or equal to smaller than the limit size, an identifier of a data brick, a pointer to a file metadata tree (e.g., Blob structure), or a pointer to a data chunk stored on the storage system. A file metadata tree is similar to a snapshot tree, but a leaf node of a file metadata tree includes an identifier of a data brick storing one or more data chunks of the content file or a pointer to the data brick storing one or more data chunks of the content file. A leaf node may correspond to a data brick. The data brick may have a corresponding brick number.

Figure 2A:
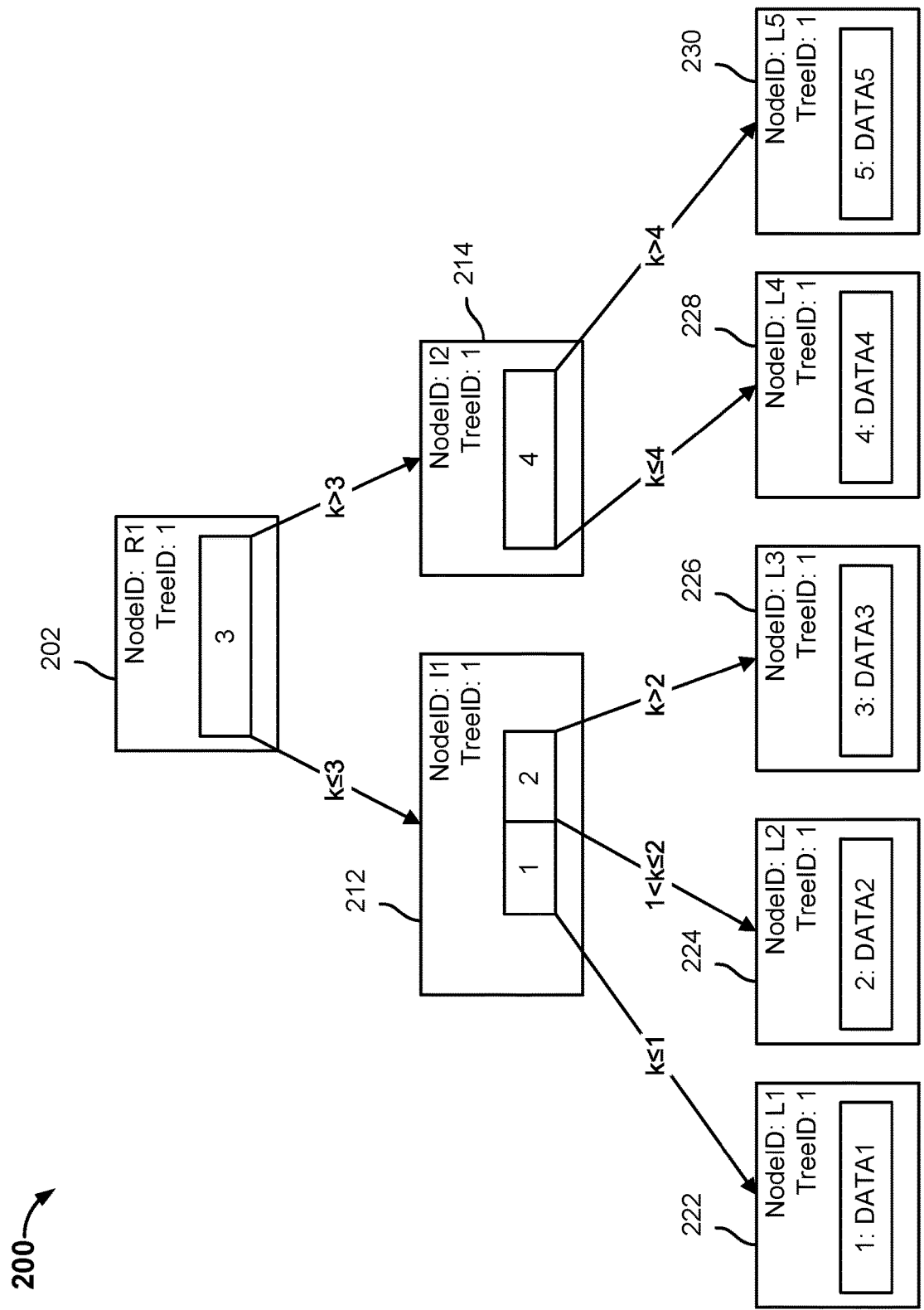
FIG. 2A is a block diagram illustrating an embodiment of a tree data structure.

For example FIGS. 2A-2D and 3A-3D describe exemplary embodiments of snapshot trees. FIG. 2A is a block diagram illustrating an embodiment of a tree data structure. A tree data structure may be used to represent the file system data that is stored on a storage system, such as storage system 104. The file system data may include metadata for a distributed file system and may include information, such as chunk identifier, chunk offset, file size, directory structure, file permissions, physical storage locations of the files, etc. A file system manager, such as file system manager 130, may generate tree data structure 200.

Tree data structure 200 is comprised of a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time t, for example at time to. The backup snapshot captures the state of a primary system, such as primary system 102. The snapshot tree in conjunction with a plurality of file metadata trees may provide a complete view of the primary system associated with the backup snapshot for the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node at the bottom of a snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be comprised of one or more data blocks. In some embodiments, the leaf node is configured to store file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key.

In other embodiments, a leaf node is configured to store the actual data when the data associated with a data item is less than or equal to a limit size. For example, data associated with a data item that is less than or equal to 256 kB may reside in the leaf node of a snapshot tree. In some embodiments, a leaf node includes a pointer to a file metadata tree (e.g., blob structure) when the size of data associated with a data item is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 may be traversed to intermediate node 212 because the data keys of "1," "2," and "3" are less than or equal to the node key "3." To find a leaf node storing a value associated with a data key of "4" or "5," the second branch of root node 202 may be traversed to intermediate node 214 because data keys "4" and "5" are greater than the node key of "3."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "4." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated. The hash function is applied to a data key to provide a hash. The hash may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers to intermediate node 212. The first set of pointers associated with a data key less than or equal to the node key (e.g., "1", "2," or "3") indicates that traversing tree data structure 200 from root node 202 to intermediate node 212 may lead to a leaf node with a data key of "1," "2," or "3." Root node 202 includes a second set of pointers to intermediate node 214. The second set of pointers associated with a data key greater than the node key indicates that traversing tree data structure 200 from root node 202 to intermediate node 214 may lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 may lead to the node with a data key of "1." The pointer to leaf node 224 indicates that traversing tree data structure 200 from intermediate node 212 to leaf node 224 may lead to the node with a data key of "2." The pointer to leaf node 226 indicates that traversing tree data structure 200 from intermediate node 212 to leaf node 226 may lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 may lead to the node with a data key of "4." The pointer to leaf node 230 indicates that traversing tree data structure 200 from intermediate node 214 to leaf node 230 may lead the node with a data key of "5."

Leaf node 222 includes a data key-value pair of "1:DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata associated with a data item. In other embodiments, leaf node 222 is configured to store a pointer to a file metadata tree (e.g., blob structure).

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata associated with a data item. In other embodiments, leaf node 224 is configured to store a pointer to a file metadata tree (e.g., blob structure).

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata associated with a data item. In other embodiments, leaf node 226 is configured to store a pointer to a file metadata tree (e.g., blob structure).

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228. In some embodiments, leaf node 228 is configured to store metadata associated with a data item. In other embodiments, leaf node 228 is configured to store a pointer to a file metadata tree (e.g., blob structure).

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230. In some embodiments, leaf node 230 is configured to store metadata associated with a data item. In other embodiments, leaf node 230 is configured to store a pointer to a file metadata tree (e.g., blob structure).

Figure 2B:
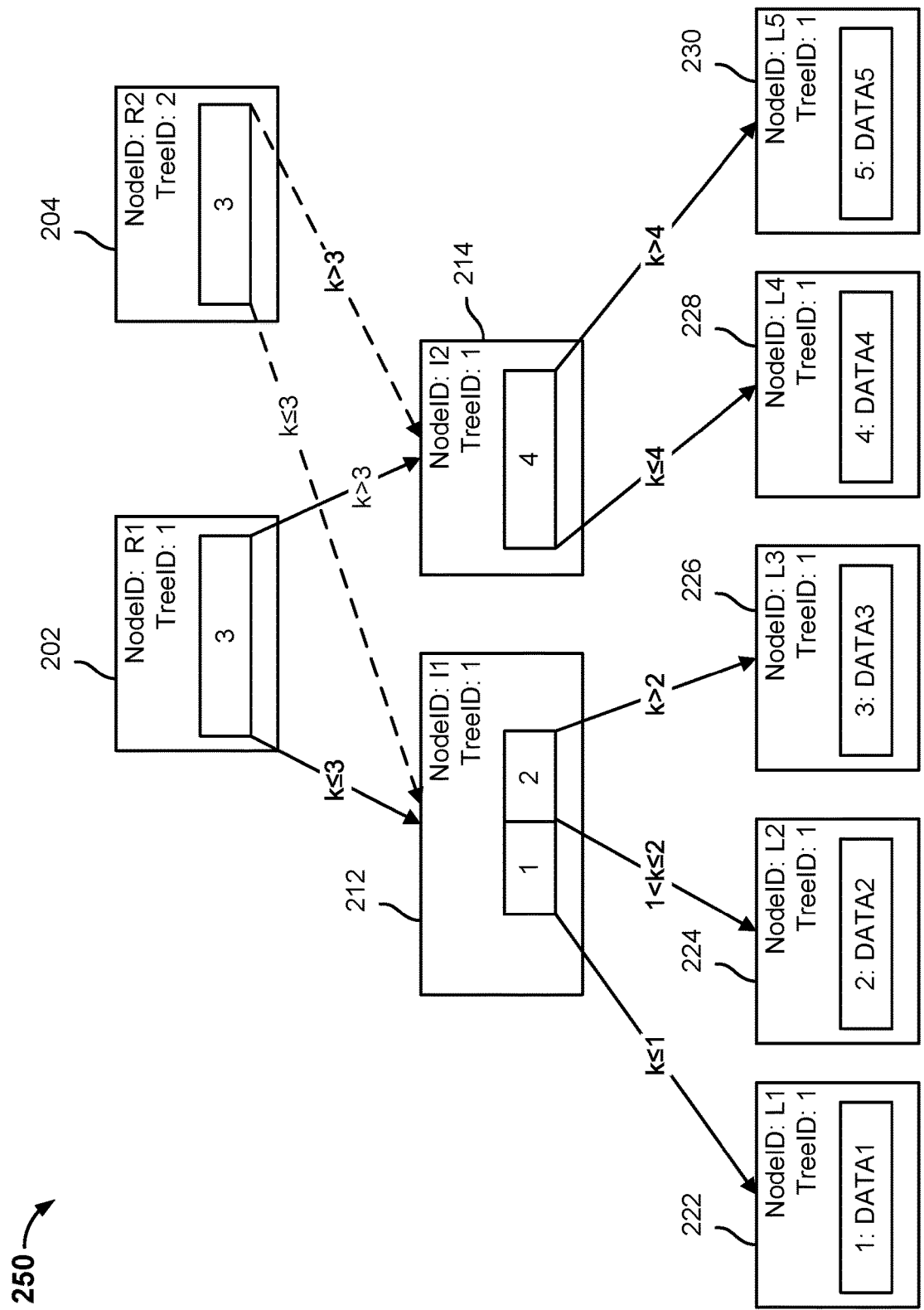
FIG. 2B is a block diagram illustrating an embodiment of a cloned snapshot tree.

FIG. 2B is a block diagram illustrating an embodiment of a cloned snapshot tree. A snapshot tree may be cloned when a snapshot tree is added to a tree data structure. In some embodiments, tree data structure 250 may be created by a storage system, such as storage system 104. The file system data of a primary system, such as primary system 102, may be backed up to a storage system, such as storage system 104. A subsequent backup snapshot may correspond to a full backup snapshot or an incremental backup snapshot. A full backup snapshot is a backup snapshot that is includes the entire state of the primary system at a particular point in time. An incremental backup snapshot is a backup snapshot includes the state of the primary system that has changed since a last backup snapshot. The manner in which the file system data corresponding to the subsequent backup snapshot is stored in storage system may be represented by a tree data structure. The tree data structure corresponding to the subsequent backup snapshot is created by cloning a snapshot tree associated with a last backup.

In the example shown, tree data structure 250 includes root nodes 202, 204, intermediate nodes 212, 214, and leaf nodes 222, 224, 226, 228, and 230. Tree data structure 250 may be a view of file system data at a particular point in time t+n, for example at time $t_1$. The tree data structure can be used to capture different versions of file system data at different moments in time. The tree data structure may also efficiently locate desired metadata by traversing a particular version of a snapshot tree included in the tree data structure. In some embodiments, the tree data structure allows a chain of backup snapshot versions (i.e., snapshot trees) to be linked together by allowing a node of a later version of a snapshot tree to reference a node of a previous version of a snapshot tree. For example, a snapshot tree with root node 204 is linked to a snapshot tree with root node 202. For each new backup snapshot, a new root node may be created for the tree data structure. The new root node includes the same set of pointers included in the previous root node; that is the new root node of the snapshot tree may be linked to one or more intermediate nodes associated with a previous snapshot tree. The new root node also includes a different NodeID and a different TreeID. The TreeID is the view identifier associated with a view of the primary system associated with the backup snapshot for the particular moment in time.

In some embodiments, a root node is associated with a current view of the file system data. A current view may still accept one or more changes to the data. The TreeID of a root node indicates a backup snapshot with which the root node is associated. For example, root node 202 with a TreeID of "1" is associated with a first backup snapshot and root node 204 with a TreeID of "2" is associated with a second backup snapshot. In the example shown, root node 204 is associated with a current view of the file system data.

In other embodiments, a root node is associated with a snapshot view of the file system data. A snapshot view may represent a state of the file system data at a particular moment in time in the past and is not updated. Therefore, a snapshot view stores a view of the tree data structure at the particular moment in time. In the example shown, root node 202 is associated with a snapshot view of the file system data.

In some embodiments, to create a snapshot tree for a backup snapshot of the file system at time t+n, for example at time $t_1$, two new root nodes are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable). In some embodiments, a root node associated with a previous snapshot view is removed from the snapshot tree after a backup snapshot is performed (e.g., root node 202 is removed after root node 204 is added).

In the example shown, root node 204 is a copy of root node 202. Similar to root node 202, root node 204 includes the same pointers as root node 202. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 may lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 may lead to a leaf node with a data key of "4" or "5." Root node 204 includes a NodeID of "R2" and a TreeID of "2." The NodeID identifies the name of the node. The TreeID identifies the backup snapshot with which the node is associated.

Figure 2C:
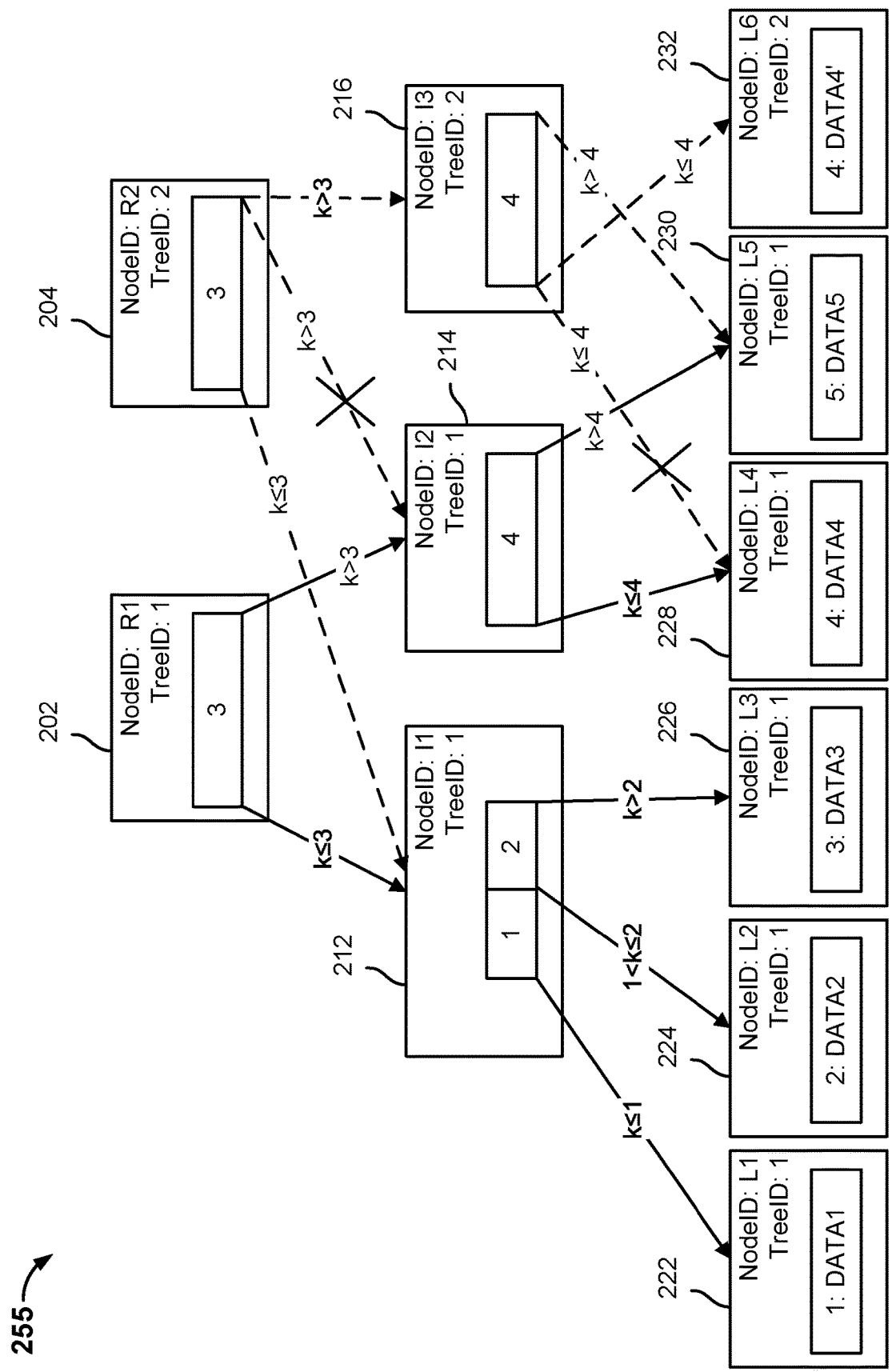
FIG. 2C is a block diagram illustrating an embodiment of modifying a cloned snapshot tree.

FIG. 2C is a block diagram illustrating an embodiment of modifying a cloned snapshot tree. In the example shown, tree data structure 255 may be modified by a file system manager, such as file system manager 130. A snapshot tree with a root node 204 may be a current view of the file system data at time t+n+m, for example, at time $t_2$. A current view represents a state of the file system data that is up-to-date and capable of receiving one or more modifications to the snapshot tree that correspond to modifications to the file system data. Because a snapshot tree represents a perspective of the file system data that is "frozen" in time, one or more copies of one or more nodes affected by a change to file system data are made.

In the example shown, the value "DATA4" has been modified to be "DAT A4'." In some embodiments, the value of a key value pair has been modified. In other embodiments, the value of the key pair is the data associated with a data item that is smaller than or equal to a limit size. In other embodiments, the value of the key value pair points to a different file metadata tree. The different file metadata tree may be a modified version of the file metadata tree that the leaf node previously pointed.

At $t_2$, the file system manager starts at root node 204 because that is the root node associated with snapshot tree at time $t_2$ (i.e., the root node associated with the last backup snapshot). The value "DATA4" is associated with the data key "4." The file system manager traverses tree data structure 255 from root node 204 until it reaches a target leaf node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made (e.g., a node copy that includes the same pointers as the copied node, but includes a different NodeID and a different TreeID). For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

In some embodiments, leaf node 232 stores the value of a key value pair that has been modified. In other embodiments, leaf node 232 stores the modified data associated with a data item that is smaller than or equal to a limit size. In other embodiments, leaf node 232 stores a pointer to a file metadata tree corresponding to the modified file that is less than or equal to a threshold size. In other embodiments, leaf node 232 stores a pointer to a file metadata tree corresponding to the modified file that is greater than a threshold size.

Figure 2D:
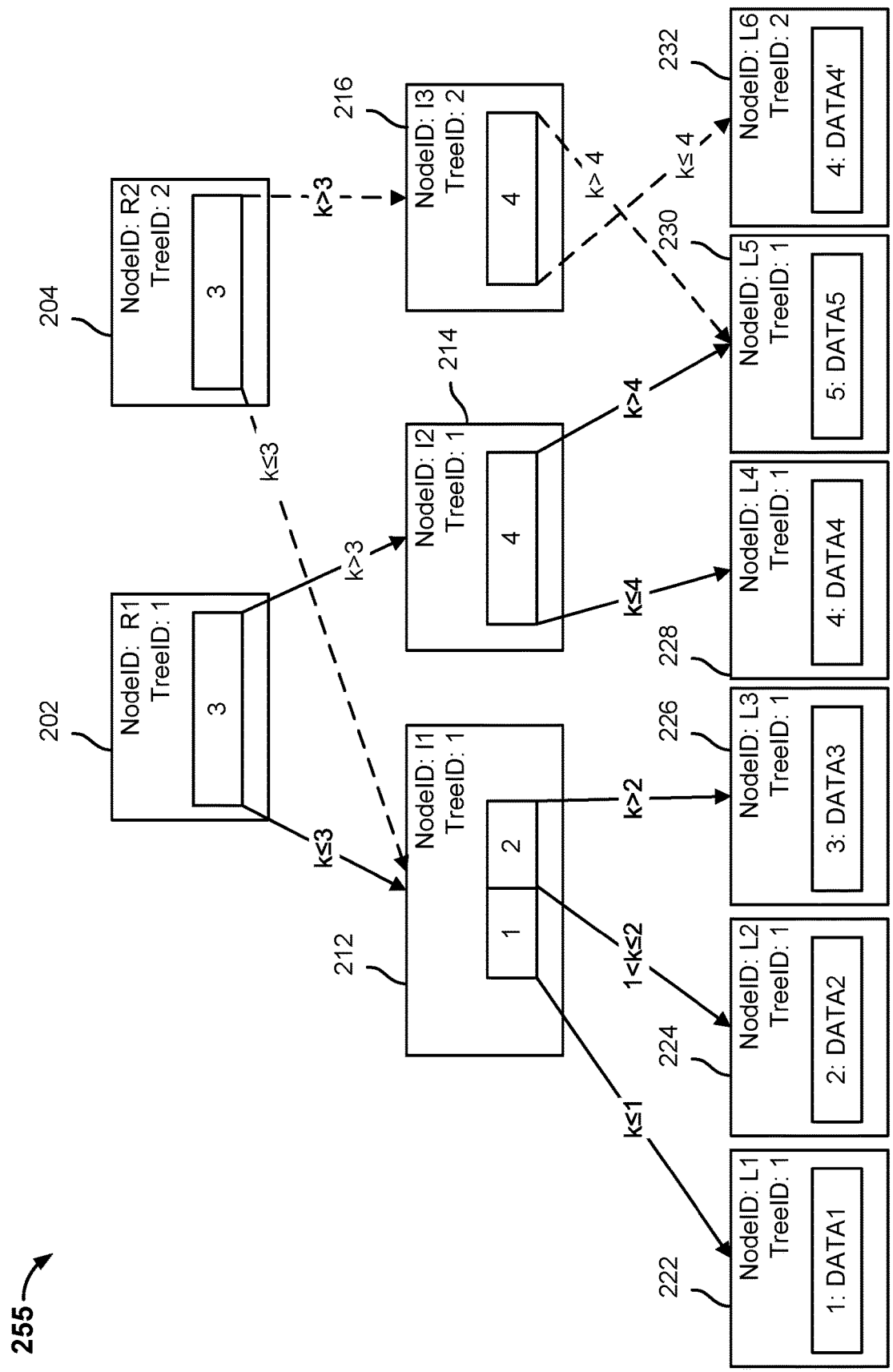
FIG. 2D is a block diagram illustrating an embodiment of a modified cloned snapshot tree.

FIG. 2D is a block diagram illustrating an embodiment of a modified cloned snapshot tree. Tree data structure 255 shown in FIG. 2D illustrates a result of the modifications made to a snapshot tree as described with respect to FIG. 2C.

Figure 3A:
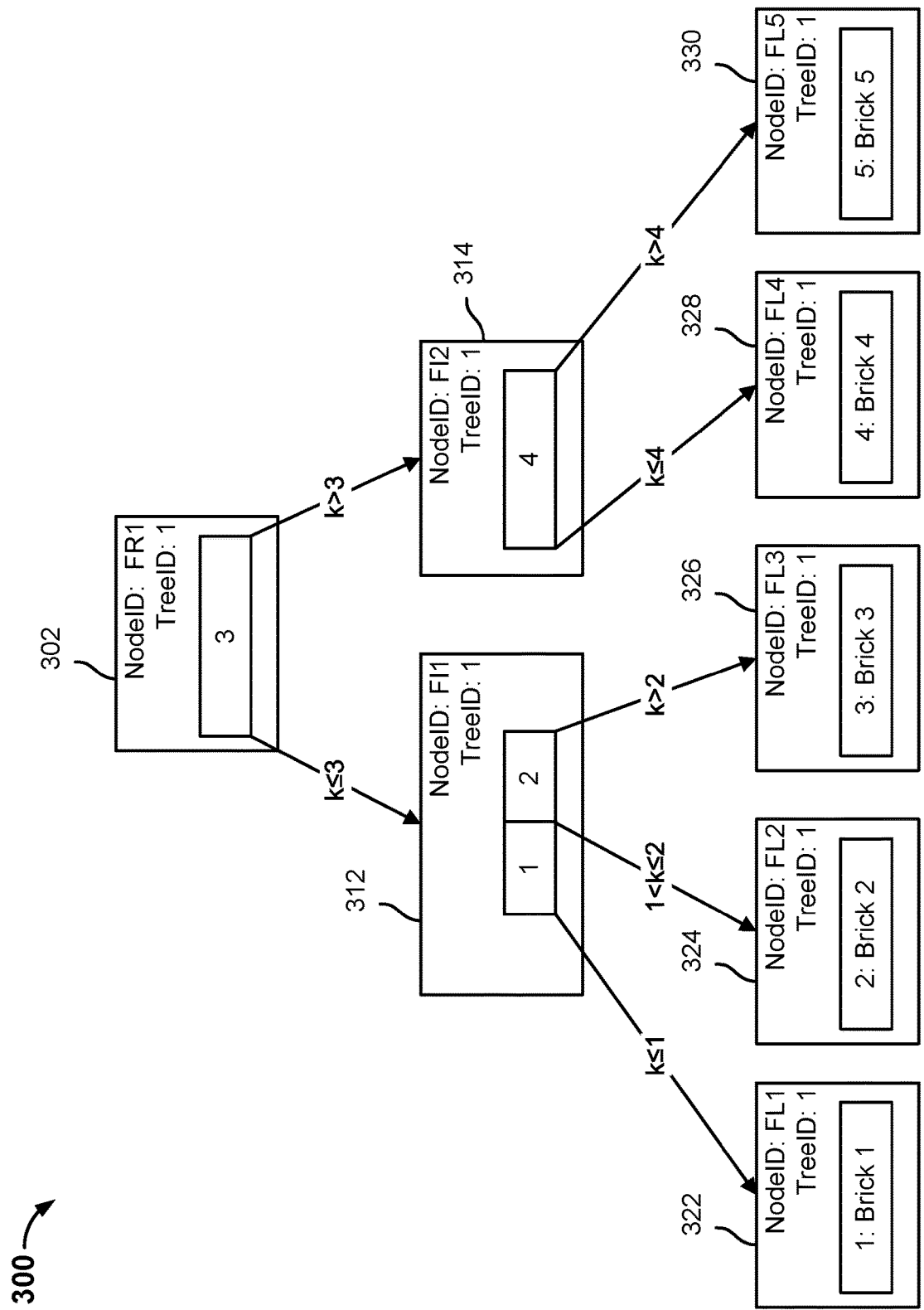
FIG. 3A is a block diagram illustrating an embodiment of a tree data structure.

FIG. 3A is a block diagram illustrating an embodiment of a tree data structure. In some embodiments, tree data structure 300 may be created by a storage system, such as storage system 104. In the example shown, tree data structure 300 corresponds to a data item and stores the metadata associated with the data item. The metadata associated with a data item is stored by a storage system as a file separate from the data item with which the metadata is associated, that is, the tree data structure is stored separately from a data item. A leaf node of a snapshot tree associated with file system data, such as a leaf node of tree data structures 200, 250, 255, may include a pointer to a tree data structure corresponding to a data item, such as tree data structure 300. A tree data structure corresponding to a data item (i.e., a "file metadata tree") is a snapshot tree, but is used to organize the data blocks associated with a data item that are stored on the storage system. Tree data structure 300 may be referred to as a "file metadata tree" or a "file metadata structure."

A tree data structure corresponding to a data item at a particular point in time (e.g., a particular version) may be comprised of a root node, one or more levels of one or more intermediate nodes, and one or more leaf nodes. In some embodiments, a tree data structure corresponding to a data item is comprised of a root node and one or more leaf nodes without any intermediate nodes. Tree data structure 300 may be a snapshot of a data item at a particular point in time t, for example at time to. A tree data structure associated with file system data may include one or more pointers to one or more tree data structures corresponding to one or more data items.

In the example shown, tree data structure 300 includes a file root node 302, file intermediate nodes 312, 314, and file leaf nodes 322, 324, 326, 328, 330. Although tree data structure 300 includes one intermediate level between root node 302 and leaf nodes 322, 324, 326, 328, 330, any number of intermediate levels may be implemented. Similar to the snapshot trees described above, each node includes a "NodeID" that identifies the node and a "TreeID" that identifies a view with which the node is associated.

In the example shown, root node 302 includes a pointer to intermediate node 312 and a pointer to intermediate node

314. Root node 202 includes a NodeID of "FR1" and a TreeID of "1." The NodeID identifies the name of the node. The TreeID identifies the snapshot/view with which the node is associated.

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 312 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing tree data structure 300 from intermediate node 312 to leaf node 322 may lead to the node with a data key of "1." The pointer to leaf node 324 indicates that traversing tree data structure 300 from intermediate node 312 to leaf node 324 may lead to the node with a data key of "2." The pointer to leaf node 326 indicates that traversing tree data structure 300 from intermediate node 312 to leaf node 326 may lead to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing tree data structure 300 from intermediate node 314 to leaf node 328 may lead to the node with a data key of "4." The pointer to leaf node 330 indicates that traversing tree data structure 300 from intermediate node 314 to leaf node 330 may lead the node with a data key of "5."

Leaf node 322 includes a data key-value pair of "1: Brick 1." "Brick 1" is a brick identifier that identifies the data brick storing one or more data chunks associated with a data item corresponding to tree data structure 300. Leaf node 322 includes NodeID of "FL1" and a TreeID of "1." To view the value associated with a data key of "1," tree data structure 300 is traversed from root node 302 to intermediate node 312 to leaf node 322.

Leaf node 324 includes a data key-value pair of "2: Brick 2." "Brick 2" is a brick identifier that identifies the data brick storing one or more data chunks associated with a data item corresponding to tree data structure 300. Leaf node 324 includes NodeID of "FL2" and a TreeID of "1." To view the value associated with a data key of "2," tree data structure 300 is traversed from root node 302 to intermediate node 312 to leaf node 324.

Leaf node 326 includes a data key-value pair of "3: Brick 3." "Brick 3" is a brick identifier that identifies the data brick storing one or more data chunks associated with a data item corresponding to tree data structure 300. Leaf node 326 includes NodeID of "FL3" and a TreeID of "1." To view the value associated with a data key of "3," tree data structure 300 is traversed from root node 302 to intermediate node 312 to leaf node 326.

Leaf node 328 includes a data key-value pair of "4: Brick 4." "Brick 4" is a brick identifier that identifies the data brick storing one or more data chunks associated with a data item corresponding to tree data structure 300. Leaf node 328 includes NodeID of "FL4" and a TreeID of "1." To view the value associated with a data key of "4," tree data structure 300 is traversed from root node 302 to intermediate node 314 to leaf node 328.

Leaf node 330 includes a data key-value pair of "5: Brick 5." "Brick 5" is a brick identifier that identifies the data brick storing one or more data chunks associated with a data item corresponding to tree data structure 300. Leaf node 330 includes NodeID of "FL5" and a TreeID of "1." To view the value associated with a data key of "5," tree data structure 300 is traversed from root node 302 to intermediate node 314 to leaf node 330.

A data item may be comprised of a plurality of data chunks. A brick may store one or more data chunks. In the example shown, leaf nodes 322, 324, 326, 328, 330 each store a corresponding brick identifier. A metadata store may include a data structure that matches a brick identifier with a corresponding location (physical location) of the one or more data chunks comprising the brick.

Figure 3B:
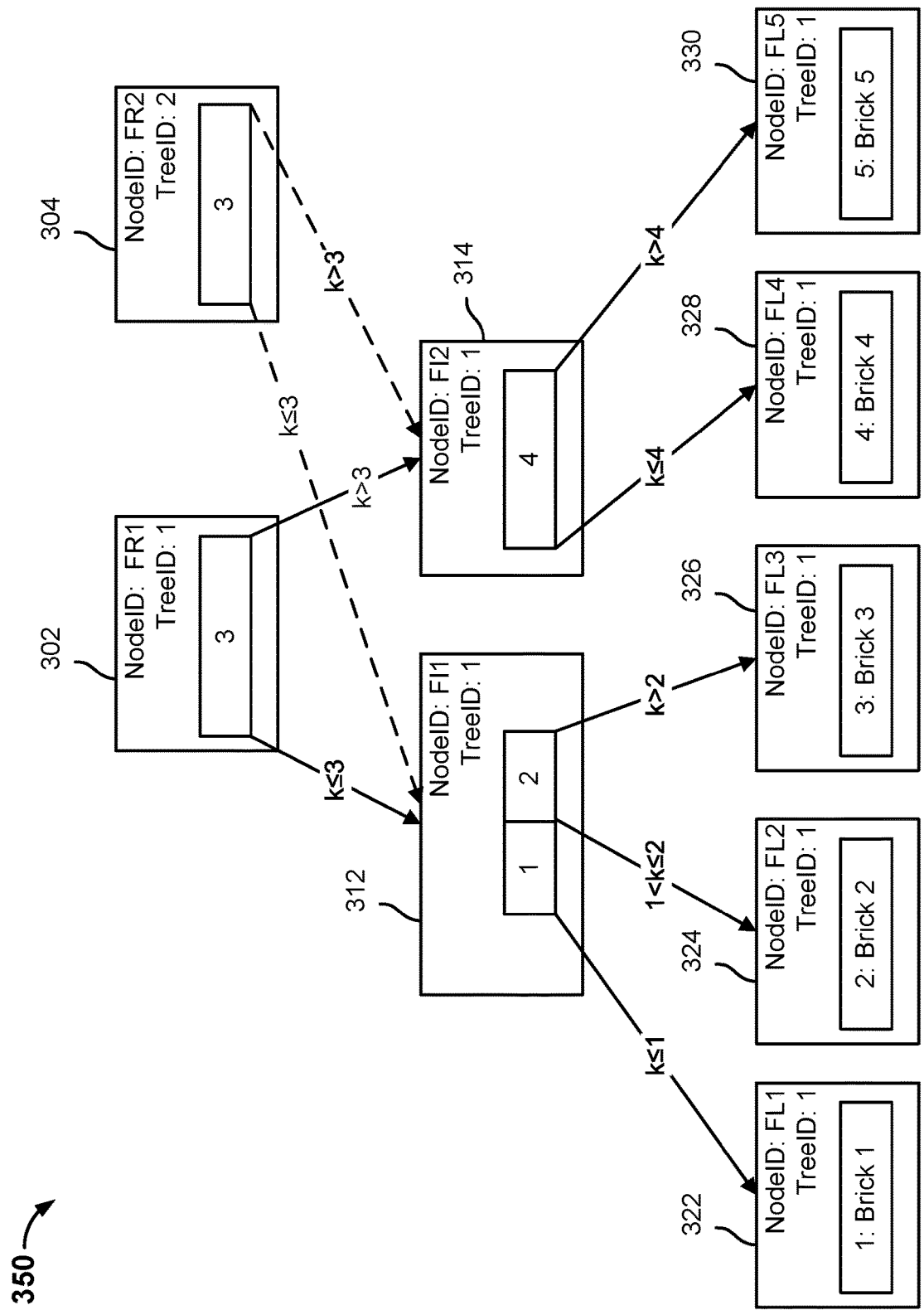
FIG. 3B is a block diagram illustrating an embodiment of cloning a file metadata tree.

FIG. 3B is a block diagram illustrating an embodiment of cloning a file metadata tree. In some embodiments, tree data structure 350 may be created by a storage system, such as storage system 104. A tree data structure corresponding to a data item is a snapshot tree, but stores metadata associated with the data item. The tree data structure corresponding to a data item can be used to capture different versions of the data item at different moments in time. In some embodiments, the tree data structure allows a chain of file metadata trees corresponding to different versions of a data item to be linked together by allowing a node of a later version of a file metadata tree to reference a node of a previous version of a file metadata tree. A file metadata tree is comprised of a root node, one or more levels of one or more intermediate nodes, and one or more leaf nodes.

A root node or an intermediate node of a version of a file metadata tree may reference an intermediate node or a leaf node of a previous version of a file metadata tree. Similar to the snapshot tree structure, the file metadata tree structure allows different versions of file data to share nodes and allows changes to a data item to be tracked. When a backup snapshot is received, a root node of the file metadata tree may be linked to one or more intermediate nodes associated with a previous file metadata tree. This may occur when the file is included in both backup snapshots.

In the example shown, tree data structure 350 includes a file metadata tree comprising root node 302, intermediate nodes 312, 314, and leaf nodes 322, 324, 326, 328, and 330. Tree data structure 350 also includes a second file metadata tree that may correspond to a backup snapshot of file data at a particular point in time t+n, for example at time $t_1$. The second file metadata tree is comprised of root node 304, intermediate nodes 312, 314, and leaf nodes 322, 324, 326, 328, and 330. To create a file metadata tree corresponding to a backup snapshot of the file data at time t+n, a new root node is created. The new root node includes the same set of pointers as the original node. In the example shown, root node 304 includes a set of pointers to intermediate nodes 312, 314, which are intermediate nodes associated with a previous backup snapshot. The new root node also includes a different NodeID and a different TreeID. The TreeID is the view identifier associated with a view of the file metadata tree at a particular moment in time. In some embodiments, root node 304 is associated with a current view of the file data. The current view may represent a state of the file data that is up-to-date and is capable of receiving one or more modifications to the file metadata tree that correspond to modifications to the file data. The TreeID of a root node indicates a backup snapshot with which the root node is associated. For example, root node 302 with a TreeID of "1" is associated with a first backup snapshot and root node 304 with a TreeID of "2" is associated with a second backup snapshot. In other embodiments, root node 304 is associated with a snapshot view of the file data. A snapshot view may represent a state of the file data at a particular moment in time in the past and is not updated.

In some embodiments, to create a view of the file data at time t+n, two new root nodes are created. Providing two new root nodes, each with a different TreeID prevents updates made to a particular view (e.g., current view) from affecting nodes of a different view (e.g., snapshot view). One of the new root nodes may be associated with a current view (i.e., modifiable) and the other new root node may be associated with a snapshot view (i.e., not modifiable).

In the example shown, root node 304 is a copy of root node 302. Similar to root node 302, root node 304 includes the same pointers as root node 302. Root node 304 includes a first set of pointers to intermediate node 312. The first set of pointers associated with a data key (e.g., "1," "2," or "3") less than or equal the node key indicates that traversing a file metadata tree included in tree data structure 350 from root node 304 to intermediate node 312 may lead to a leaf node with a data key of "1," "2," or "3." Root node 304 includes a second set of pointers to intermediate node 314. The second set of pointers associated with a data key greater than the node key indicates that traversing a file metadata tree included in tree data structure 350 from root node 304 to intermediate node 314 may lead to a leaf node with a data key of "4" or "5." Root node 304 includes a NodeID of "FR2" and a TreeID of "2." The NodeID identifies the name of the node. The TreeID identifies the backup snapshot with which the node is associated.

Figure 3C:
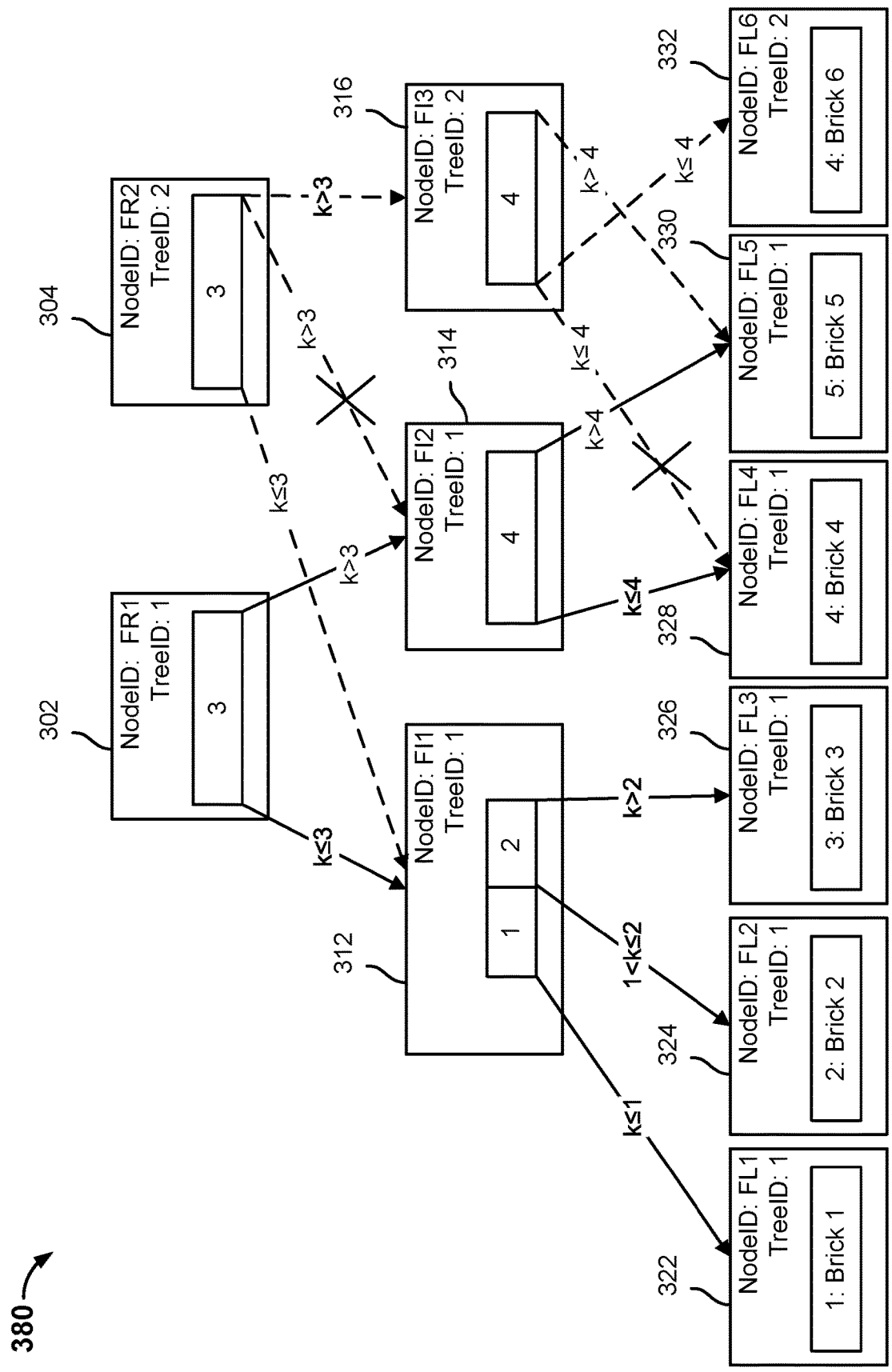
FIG. 3C is a block diagram illustrating an embodiment of modifying a cloned file metadata tree.

FIG. 3C is a block diagram illustrating an embodiment of modifying a cloned file metadata tree. In the example shown, tree data structure 380 may be modified by a file system manager, such as file system manager 130. A file metadata tree with root node 304 may be a current view of the file data at time t+n+m, for example, at time $t_2$. A current view may represent a state of the file data that is up-to-date and capable of receiving one or more modifications to the file metadata tree that correspond to modifications to the file system data. Because a snapshot view represents a perspective of the file data that is "frozen" in time, one or more copies of one or more nodes affected by a change to file data are made.

In some embodiments, the file data may be modified such that one of the data chunks is replaced by another data chunk. When a data chunk of file data associated with a previous backup snapshot is replaced with a new data chunk, the data brick storing the data chunk may be different. A leaf node of a file metadata tree stores a brick identifier associated with a particular brick storing the data chunk. To represent this modification to the file data, a corresponding modification is made to a current view of a file metadata tree. The current view of the file metadata tree is modified because the previous file metadata tree is a snapshot view and can no longer be modified. The data chunk of the file data that was replaced has a corresponding leaf node in the previous file metadata tree. A new leaf node in the current view of the file metadata tree is created, as described herein, that corresponds to the new data chunk. The new leaf node includes an identifier associated with the current view. The new leaf node may also store the chunk identifier associated with the modified data chunk.

In the example shown, a data chunk included in "Brick 4" has been modified. The data chunk included in "Brick 4" has been replaced with a data chunk included in "Brick 6." At $t_2$, the file system manager starts at root node 304 because that is the root node associated with the file metadata tree at time $t_2$. The value "Brick 4" is associated with the data key "4." The file system manager traverses tree data structure 380 from root node 304 until it reaches a target leaf node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 380 from intermediate node 316 to leaf node 328, determines that the TreeID of leaf node 328 does not match the TreeID of root node 304, and creates a copy of leaf node 328. Leaf node 332 is a copy of leaf node 328, but stores the brick identifier "Brick 6" and includes the same TreeID as root node 304. The file system manager updates a pointer of intermediate node 316 to point to leaf node 332 instead of pointing to leaf node 328.

Figure 3D:
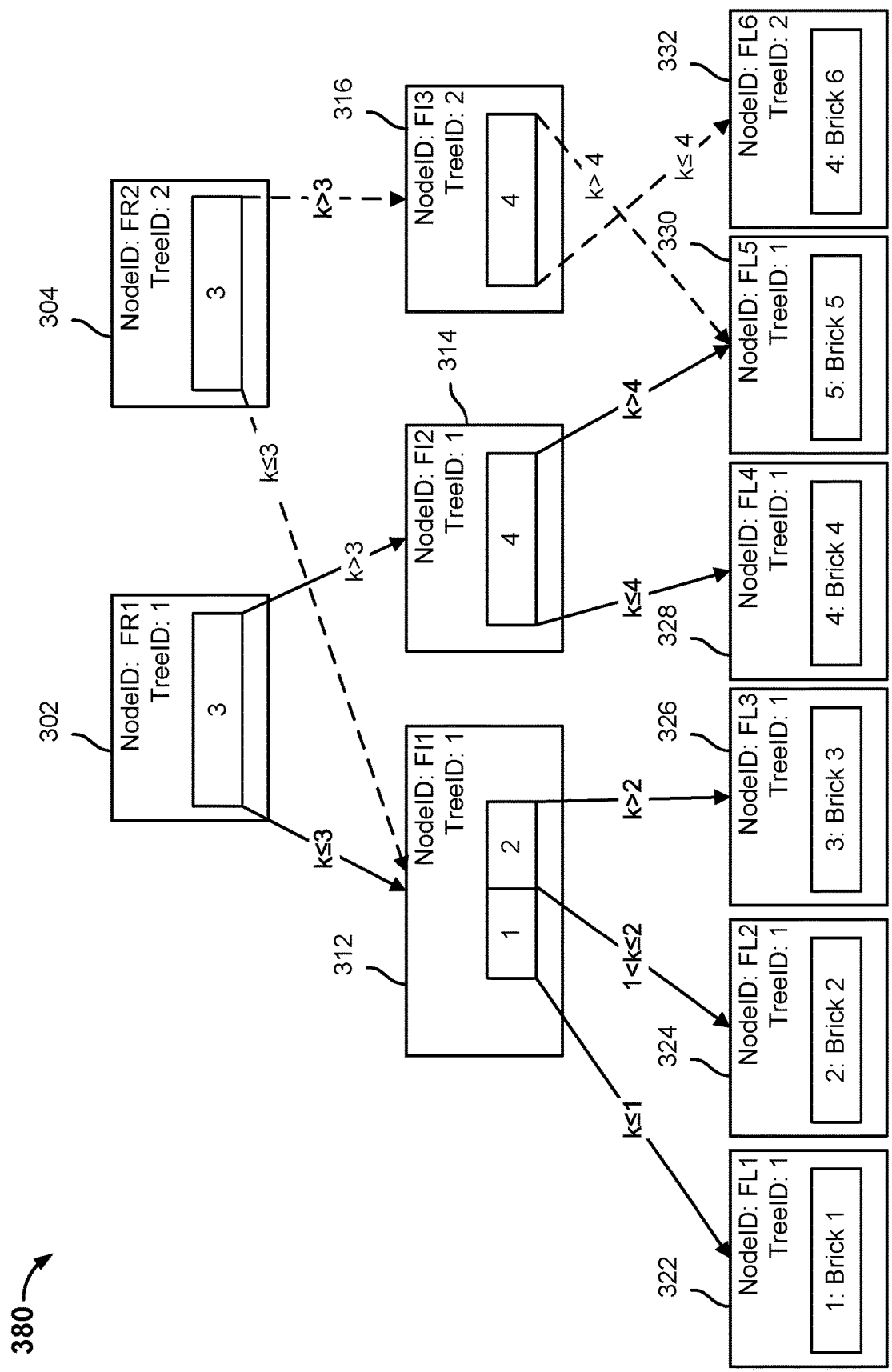
FIG. 3D is a block diagram illustrating an embodiment of a modified cloned file metadata tree.

FIG. 3D is a block diagram illustrating an embodiment of a modified cloned file metadata tree. The file metadata tree 380 shown in FIG. 3D illustrates a result of the modifications made to file metadata tree 380 as described with respect to FIG. 3C.

Referring back to FIG. 1, secondary storage system 104 may efficiently and reliably back up data for primary storage system 102 in a distributed manner. More specifically, secondary storage system 104 may distribute tasks associated with backing up and restoring data from a data source (e.g. cluster 108, cloud 101) to a target storage (e.g. primary storage system 102 or other device). Further, secondary storage 104 may efficiently and reliably restore selected content (including content attributes) from secondary storage system 104 to a target storage.

Figure 4:
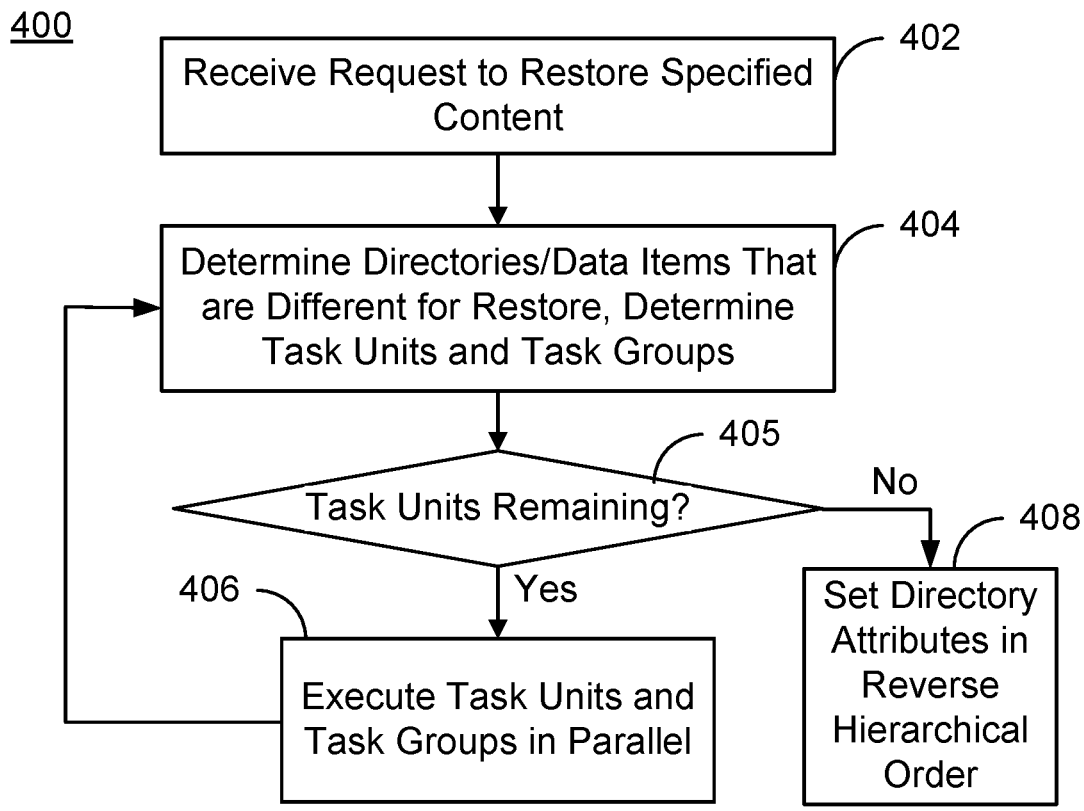
FIG. 4 is a flow chart depicting an embodiment of a method for restoring data.

FIG. 4 is a flow chart depicting an embodiment of method 400 for performing restores. Portions of method 400 may be performed in a different order than shown and may include sub-processes. Additional and/or other processes not inconsistent with the method and system described herein may also be performed. In some embodiments, method 400 is performed using processor(s) executing instruction(s) stored in memory or another non-transitory computer-readable medium. For example, method 400 may be performed by file system manager 130 and/or agent 132 of FIG. 1. In some embodiments, other and/or additional component(s) may be used for process 400. Although described in the context of restores of content from secondary storage to primary storage, in some embodiments, method 400 may be used to restore content from other data source(s) (e.g. one portion of primary storage 102) and/or to other target storage (e.g. another portion of primary storage 102, cloud 101 or clients 107). In some embodiments, method 400 may be carried out by agent 132 and/or other software and/or hardware component(s) on primary storage 102.

A request to restore specified content is received, at 402. The specified content is the content to be restored. The specified content may include hierarchically organized directories and data items such as files, emails, links and other items that may be present in a directory. In addition, both the data source for the specified content and the target storage to which the specified content is to be restored are identified at 402. For example, a user may select the specified content in cluster 108 of secondary storage 104 (e.g. the data source) be restored to location(s) in primary storage 102 (e.g. the target storage). In such an example, the user may identify the specified content to file system manager 130 via a graphical user interface or other input mechanism. In other embodiments, a user may select content in one portion of primary storage 102 to be copied or restored to another portion of primary storage 102.

Differences between the target storage and the data source are determined, at 404. For example, directories in the target storage may be traversed and their contents compared to directories and their contents that are part of the specified content at the data source. In some instances, the specified content is desired to be restored to its original location or to another location; furthermore, the location where the specified content will be restored may already include some contents. Consequently, some or all of the specified content to be restored may already be present in the target storage. If some or all of the specified content is already present in the target storage with the correct attributes, it may not be necessary to restore them in the restore process. For example, a sub-directory structure, and all of its contents may exist on the target storage and match the corresponding sub-directory structure, along with all of its contents on the data source; in this case, it is not necessary to restore the sub-directory structure at the target storage. In some cases, a directory on the target storage may also exist on the target storage, but the directories may include data items that differ in some way (e.g. different data items are present, data items with different attributes are present) and/or have different attributes. In this case, it may not be necessary to re-create the directory, but it may still be necessary to restore the attributes of the directory at the target storage, as well as manage the restoration of the data items, as necessary. Determining the difference between the target storage and the specified content in 404 allows for the possibility of streamlining the restore process by identifying contents such as data items which are already present in the target storage and avoiding the unnecessary retrieval, transmission and/or restoration of such data items. In some embodiments, the differences between the target storage and data source may be determined by traversing the directories and/or tree data structure(s). This may occur in hierarchical order; in this case, the differences between the contents of a directory corresponding to the data source the contents of the directory at the target storage may be determined before such a determination is made for its sub-directories. In some instances, step 404 may determine only some of the differences between the target storage and the data source. For example, for a large directory structure, there may be a large number of differences. In such a case, at 404 some portion of the directory structure may be traversed and differences determined for a portion of the directory structure. Steps 404, 405 and 406 (described below) may then be performed iteratively to complete the restore.

Also in 404, some or all of the task units and task groups used in restoring specified content are determined. For example, task units and task groups including tasks which may be executed in hierarchical order may be determined. Examples of tasks that may be executed in hierarchical order may include tasks related to: the creation, update or deletion of data items, the setting or re-setting of attributes for data items, the creation or deletion of directories, the update or restoration of data for data items, the setting or re-setting of non-hierarchically-based attributes of directories, or combinations thereof. In contrast, tasks which must be executed in reverse hierarchical order include setting or re-setting hierarchically-based attributes for directories. In some embodiments, the restore is performed utilizing task units, task groups, and/or multiple passes of directories. In some embodiments, some or all of the tasks required to complete the restore of the specified content are broken into task units. Task units are divided into task groups. The task units may be weighted and divided into task groups based on their weights. Each task group may have approximately the same total weight of task units. Task groups can operate in parallel with other task groups, each task group processing its own respective task units. It is determined whether there are any outstanding task units and task groups from 404 to be executed, at 405.

If there are outstanding task units or task groups which may be executed in hierarchical order, then these task unit and task groups can be executed in parallel, at 406. In an example, the task units or task groups which may be executed in hierarchical order may comprise the tasks required to restore the specified content excluding tasks which must be executed in reverse hierarchical order such as the setting or re-setting of hierarchically-based attributes for directories. In some embodiments, only the portion of the specified content determined at 404 to be different from that in the target storage is restored at 406. In some embodiments, an additional portion including some specified content which is not determined to be different from that in the target storage (e.g. some or all of the specified content) may be retrieved, transmitted and/or restored at 406. In some embodiments, restoration of the content in parallel at 406 includes deleting content at the target storage that is not present at the data source. For example, a data item that is at the target storage but not at the data source may be deleted. In other embodiments, the data item may be allowed to remain. In some embodiments, if a data item at the target storage differs from the data item corresponding to the data source, the data item corresponding to the data source may replace the data item at the target storage. In other embodiments, only the portions of the content that are changed are replaced. For example, if a data item at the target storage has different data (e.g. file contents) and/or attribute(s) than the data item at the data source, the data, the attribute(s) for the data item at the target storage, or combinations thereof, may be replaced with the corresponding data and/or attribute(s) from the data source. In the case of a directory, if a directory from the data source already exists at the target storage, but has different attributes and/or contents, the directory may or may not be re-created at the target storage; however, any non-hierarchically based attributes that are different between the data source and the data target must be set or re-set and may be set or re-set in hierarchical order.

As part of the restore process, the directories are created at the target storage in hierarchical order, with a directory created before its sub-directories are created. A directory can be populated with data items (e.g. files), with each data item created only after the directory containing the respective data item has been created. The data can be written for the data items after creation of the data item. Attributes of the data items are set after the data is written to the data item. However, the specified content being restored may include hierarchically organized directories and subdirectories. In some embodiments, no attributes of directories are set as part of 406. In other embodiments, some or all non-hierarchically-based attributes (attributes that do not depend upon content in another level of the hierarchy such as a subdirectory) of directories may be set at 406. However, hierarchically-based attributes of directories are not set at 406.

In addition, 404 and 406 may be performed iteratively. For example, differences between the data source and the target storage may be determined for part of the specified content in 404, the content restored at 406 and step 404 repeated. For example, step 404 may be repeated for a different portion of the specified content. This process may continue until it is determined at 405 that, task units and task groups for tasks which may be executed in hierarchical order, as determined in 404, have completed.

If it is determined in 405 that 404 and 406 have completed, at least some of the attributes of the directories are set in reverse hierarchical order, at 408. The hierarchically-based attributes of directories are set at 408. Non-hierarchically-based attributes of hierarchically organized contents (directories and subdirectories) may or may not be set, as required. For example, some or all non-hierarchically-based attributes may for directories have been set in 406. Hierarchically-based attributes of a directory are only set after the directory and all of its sub-directories are created and fully populated, including setting the hierarchically-based attributes of all sub-directories and setting of attributes of data items (performed in 406). Furthermore, at least the hierarchically-based attributes of the directories (e.g. the hierarchically organized items) are set at 408 in reverse hierarchical order. Thus, the hierarchically-based attributes for a directory set only after the hierarchically-based attributes for all of the directory's sub-directories have been set. In some embodiments, the process of setting the hierarchically-based attributes of the directories in reverse hierarchical order may not take place until all of the specified content's directories and sub-directories have been created and all of the specified content's data items have been restored (i.e. the data items have been created, data restored, attributes set), as indicated in method 400.

Method 400 may provide an efficient restore process. If the difference between the specified content and items present at the target storage is determined in 404, restoring items that are already present in the target storage may be avoided. Further, for content that is different, the content may be replaced by content from the data source or only the portions of the content that are different (e.g. an attribute) may be updated. Thus, the restore process may be more efficient. Dividing the operations into task units, distributing the task units and utilizing hierarchical creation and population of directories in conjunction with reverse hierarchical attribute setting for hierarchically-based attributes of directories may also improve efficiency by allowing for a highly parallelized restore. In some embodiments, additional efficiencies may be achieved by weighting the task units and distributing the task units at least in part based on weight. As a result, method 400 may enhance performance of restores.

Figure 5:
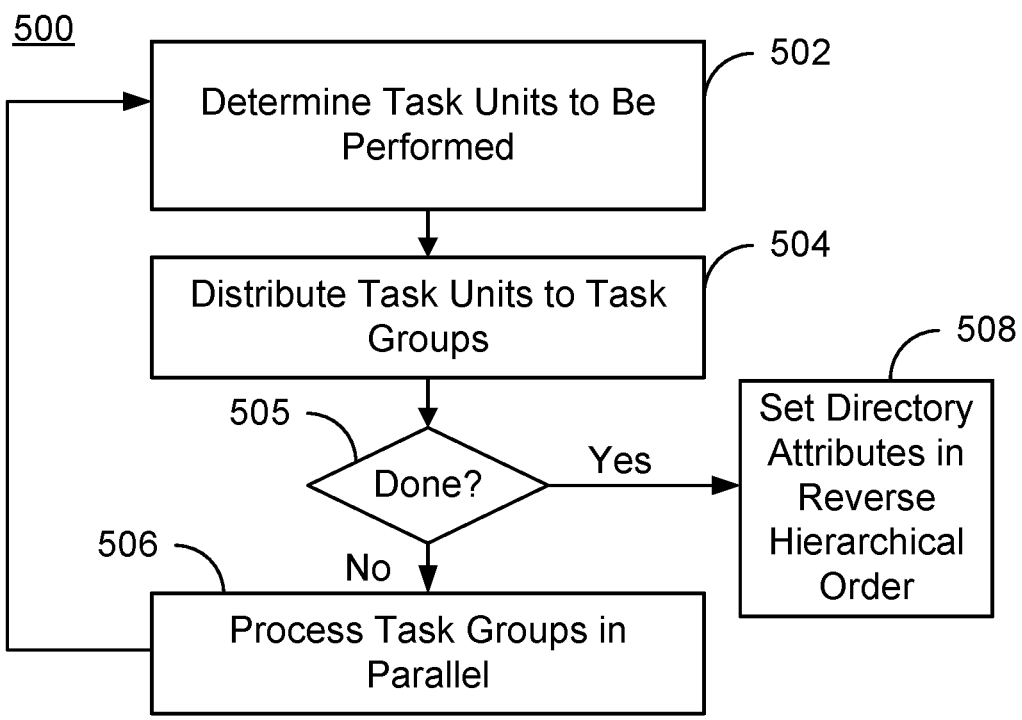
FIG. 5 is a flow chart depicting an embodiment of a method for restoring data.

FIG. 5 is a flow chart depicting an embodiment of method 500 for performing restores. Method 500 is described in the context of system 100. However, nothing prevents method 500 from use with other systems. Portions of method 500 may be performed in a different order than shown and may include sub-processes. Additional and/or other processes not inconsistent with the method and system described herein may also be performed. In some embodiments, method 500 is performed using processor(s) executing instruction(s) stored in memory or another non-transitory computer-readable medium. For example, method 500 may be performed by file system manager 130 and/or agent 132 of FIG. 1. In some embodiments, other and/or additional component(s) may be used for process 500. In some embodiments, method 500 may be used in combination with at least part of method 400. In other embodiments, method 500 may be used separately from method 400. Although described in the context of restores of content from secondary storage 104 to primary storage 102, in some embodiments, method 500 may be used to restore content from other data sources and/or to other target storage. In some embodiments, method 500 may be carried out by agent 132 and/or other software and/or hardware component(s) that may reside on primary storage 102. In some embodiments, method 500 commences after the content to be restored has been received and at least a portion of the differences between the data source and target directory determined. Thus, method 500 may be considered to include a portion of 404, 405, 406 and 408 of method 400. In some instances, method 500 receives only some of the differences between the target storage and the data source for each iteration (described below). For example, for a large directory structure, there may be a large number of differences. In such a case, some portion of the directory structure is traversed and differences determined for this portion of the directory structure. At each iteration of method 500 (described below) another portion of the differences may be provided for execution of that iteration. For example, in some embodiments, file system manager 130 might determine a portion of the differences between the target storage and data source and provide the portion of the differences to agent 132 for executing an iteration of method 500. In other embodiments, a single component 130 or 132 might determine a portion of the differences between the target storage and data source and use the portion of the differences to execute an iteration of method 500.

Task units to be performed to restore the specified content are determined, at 502. At 502, processes utilized in restoring the specified content are broken into a number of task units. Each task unit includes one or more corresponding tasks to be performed to restore the specified content. In some embodiments, each task unit includes only one task to be performed to restore the specified content. Task units may include file system operations. For example, a task unit may include setting an attribute, creating a directory, creating a hard link, creating a symbolic link, creating a file, writing a specified amount of data, or combinations thereof. Other task units are possible. Further, each task unit may be assigned a weight value. This weight value may be determined based upon an expected time to perform the task unit and/or computing resources expected to be consumed to perform the task unit. Task units which are expected to require a larger amount of time to perform and/or that are expected to consume a larger amount of computing resources may have a higher weight than task units which are expected to require less time to perform and/or consume fewer resources.

The task units which must be executed in hierarchical order are distributed to task groups, at 504. In some cases, some or all task units which may be executed in hierarchical order are also distributed to task groups at 504. Each task group may include multiple task units. In some embodiments, the task units are distributed to task groups based upon the task units' weights. For example, task units may be assigned such that each task group's weight is substantially the same as another task group's weight. In some such embodiments, the total weight of the task units in each task group is within a threshold of a target weight. In some embodiments, the structure of the specified content may be used to guide the assignment of task units to task groups. For example, task units that create data items in a particular directory may be preferentially assigned to the same task group. In some embodiments, other and/or additional mechanisms may be used to assign task units to task groups. Although the groups may have substantially the same weight, individual tasks within the group may have different weights. It is determined whether any of the task units and task groups remain to be processed (e.g. whether steps 502, 504, and 506 have completed), at 505.

If it is determined at 505 that 502, 504 and 506 are not complete (task units and task groups which must be executed before the hierarchically-based attributes of directories may be set remain to be operated on), at least a portion of the task groups are processed in parallel, at 506. Different task groups may be processed in parallel and can concurrently execute task units so that task units can be performed in parallel. For example, requests to create directories, requests to create data items, requests to write data, requests to set data item attributes and/or other requests may be executed in parallel. As a result, the task units distributed to different task groups may be concurrently executed. Thus, at 504 and 506, task units are distributed in groups and the groups may be processed independently. A task group may not require information regarding the state of another task group.

Returning to 502, remaining processes utilized in restoring the specified content are broken into a number of task units which can be divided into tasks, distributed to groups and processed. If, however, it is determined at 505 that all of the tasks which must be executed before the hierarchically-based directory attributes may be set have been determined (502), distributed (504) and processed (506) then hierarchically-based attributes for directories may be set in reverse hierarchical order, at 508. In some embodiments, all attributes are set for directories at 508. Tasks required for restoration which may be executed in reverse-hierarchical order which have not yet been executed may be executed at 508. In other embodiments, only hierarchically-based attributes are set at 508.

For example, suppose specified content stored in cluster 108 is desired to be restored to a location on primary storage 102. The specified content to be restored may include directories and data items such as emails and other files. For the purposes of explanation, suppose that the target storage is empty. Thus, all content is to be restored. At 502, the task units for creating each directory, creating each data item and writing the data for each data item, and setting the attributes for each data item are determined. Other tasks which must be executed before the hierarchically-based attributes of the directories are set may also be determined (e.g. setting the attributes of a directory's contents that could cause an attribute of the directory to be updated or change). Other tasks which must be executed to complete the restoration and may be executed before setting the hierarchically-based attributes for directories may also be determined (e.g. setting non-hierarchically based attributes of content which do not cause an attribute of the content's parent directory to be updated or change). At 504, these task units are distributed to task groups. For example, task units for creating a directory, providing all of its data items and setting the attributes of the directory's data items may be distributed to a first task group; task units for creating subdirectories may be distributed to a second task group; and task units for providing and setting the attributes of data items in the subdirectories may be assigned to a third task group. Task units for setting the attributes of the directory and subdirectories may be assigned to a fourth task group and/or performed later at 508. These task groups may operate in parallel to execute the task units, such as creation of directories, in parallel at 506. Consequently, restore of the specified content may be performed in parallel.

Using method 500, restoring the specified content may be improved. If method 500 is used in conjunction with 404 of method 400, the benefits of method 400 may be achieved. In addition, efficiency of the restore may be further improved. Task units may also be weighted and distributed to different task groups based on their weight. The task groups may then operate in parallel, thereby performing task units in parallel. Consequently, the restore process is broken into smaller task units which may be more readily processed. Further, these task units are executed in parallel in task groups that may have substantially the same weight. Thus, the restore process may be more highly parallelized and more efficient. For restoring of volumes containing large numbers of data items, method 500 may be significantly more efficient than other mechanisms for performing a restore. As a result, performance of restore operations may be improved.

Figure 6:
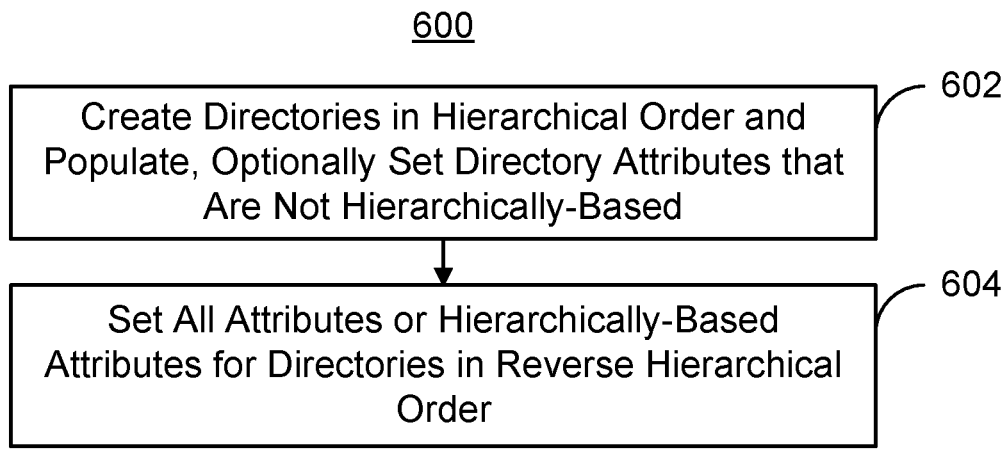
FIG. 6 is a flow chart depicting an embodiment of a method for restoring data.

FIG. 6 is a flow chart depicting an embodiment of method 600 for performing restores. Method 600 is described in the context of system 100. However, nothing prevents method 600 from use with other systems. Portions of method 600 may be performed in a different order than shown and may include sub-processes. Additional and/or other processes not inconsistent with the method and system described herein may also be performed. In some embodiments, method 600 is performed using processor(s) executing instruction(s) stored in memory or another non-transitory computer-readable medium. For example, method 600 may be performed by file system manager 130 and/or agent 132 of FIG. 1. In some embodiments, other and/or additional component(s) may be used for process 600. In some embodiments, method 600 may be used in combination with at least part of method 400 and/or method 500. In other embodiments, method 600 may be used separately. Although described in the context of restores of content from secondary storage 104 to primary storage 102, in some embodiments, method 600 may be used to restore content from other data sources and/or to other target storage. In some embodiments, method 600 may be carried out by agent 132 or other software and/or hardware component(s) that may reside on primary storage 102.

Method 600 commences after the specified content, including the data source of the specified content, has been specified, for example via a request to restore the specified content. In addition, the target storage to which the content is to be restored is determined. The specified content to be restored includes hierarchically organized directories and subdirectories and the data items stored therein are content that may be restored using method 600.

The hierarchically organized directories (and subdirectories) are created at the target storage and populated, at 602. In some instances, 602 includes file system manager 130 or other component of secondary storage 104 issuing requests to primary storage 102 to create and populate the directories. Populating a directory includes creating the data items therein and writing data to the data items; and may include setting the attributes of the data items. Creation of directories at 602 is performed in hierarchical order, such that parent directories (i.e. ancestor directories) are created before their subdirectories (i.e. child directories). In some embodiments, the directories are created in hierarchical order such that directories at higher levels in the hierarchy are created before directories at lower levels in the hierarchy. In other embodiments, a directory at a higher level in the hierarchy might be created after a subdirectory at a lower level in the hierarchy if the directory and subdirectory are along different branches of the hierarchy (i.e. the higher level directory is not an ancestor of the lower level directory). For example, a parent directory is always created before its child directory.

The directories are also populated at 602. Consequently, data items in the directories are created at the target storage and data written into the data items from the data source to the target storage. Attributes for the data items may be set. Attributes include metadata specifying properties of the item. For example, creation time and last modification time are attributes in some embodiments. In some embodiments, all of a directory's files must be fully populated before the directory's sub-directories are created and populated. However, in some embodiments, a directory's sub-directories may be created and populated before all of the directory's files are fully populated.

Tasks such as creating directories and populating directories in 602 can be performed in parallel. For example, method 500 may be used to divide tasks (such as tasks related to creating directories and populating directories as described in 602) into task units, organize the task units into task groups and process the task groups in parallel. Thus, task units used in creating and populating directories may be performed in parallel. Consequently, operations such as creation of directories, creation of data items and writing to data items are executed in parallel while still maintaining the requirement that directories are created in hierarchical order (i.e. a directory is always created before any of its sub-directories). In some embodiments, non-hierarchically-based attributes of directories may also be set in hierarchical order at 602.

At least some of the attributes for the directories in the hierarchy are set in reverse hierarchical order, at 604. In embodiments in which no directory attributes are set at 602, all directory attributes are set at 604. In embodiments in which all non-hierarchically based attributes are set at 602, hierarchically-based attributes are set for directories at 604. In some cases, only some of the non-hierarchically based attributes of directories may be set at 602, in which case, the remaining non-hierarchically based attributes and hierarchically-based attributes of directories may be set at 604. In some instances, 604 includes file system manager 130 issuing requests to primary storage 102 for the hierarchically organized directories to have some attributes set in reverse hierarchical order. Thus, hierarchically-based attributes are set for a parent directory's subdirectories before the hierarchically-based attributes are set for the parent directory. In some embodiments, the hierarchically-based attributes for the directories in the hierarchy are set from lowest level in the hierarchy to highest. In some embodiments, a directory may be assigned an attribute sort value that reflects the directory's level in the hierarchy. Assigning attribute sort values to directories can simplify sorting the directories in reverse-hierarchical order. The maximum attribute sort value may be a large number (or any number greater than or equal to the total number of levels in the hierarchy) and can be assigned to the highest level of the hierarchy (e.g. the root). The attribute sort value corresponding to a level in the hierarchy is the maximum attribute sort value minus the level of the hierarchy. For example, for the level 1, j=L−1, where L is a constant equal to at least the total number of levels of the hierarchy and j is the value of the attribute sort value.

In some embodiments, the lowest level in the hierarchy, which has the lowest value of the attribute sort value, may have its hierarchically-based attributes set first. In this case, hierarchically-based attributes may be set for higher levels in the hierarchy in reverse hierarchical order, guided by the attribute sort value. In some embodiments, hierarchically-based attributes may be set for all directories having the same attribute sort value in parallel by issuing one or more update attribute commands. In some embodiments, method 500 may be used to divide the setting of attributes task units, organize the task units into groups and process the groups in parallel. Thus, task units used in setting the hierarchically-based attributes for a level of the hierarchy may be performed in parallel. Thus, hierarchically-based attributes for the directories may be set in reverse hierarchical order.

Because the directories are created in hierarchical order and populated, creating the directories and providing the data items therein is streamlined. The non-hierarchically based attributes of content may also be set in hierarchical order. Thus, this portion of the restore process is made more efficient. In an embodiment, after the directories are created and populated in 602, at least the non-hierarchically based attributes for the directories are set in reverse hierarchical order at 604. Because the directories' hierarchically-based attributes are set in reverse hierarchical order, setting the attributes is also more efficient. If all attributes (both hierarchically-based and non-hierarchically-based attributes) of a directory were set before the hierarchically-based attributes of its subdirectories, the hierarchically-based attributes of the directory may need to be updated after each subdirectory has its hierarchically-based attributes set. As a result, the restore process would be slowed and involve performing the same set of attribute-setting operations multiple times on the same directory. By setting the hierarchically-based attributes of the directories in reverse hierarchical order, the procedure used in setting directories' attributes is also streamlined and made more efficient. Consequently, method 600 may result in a more efficient restore process.

Figure 7:
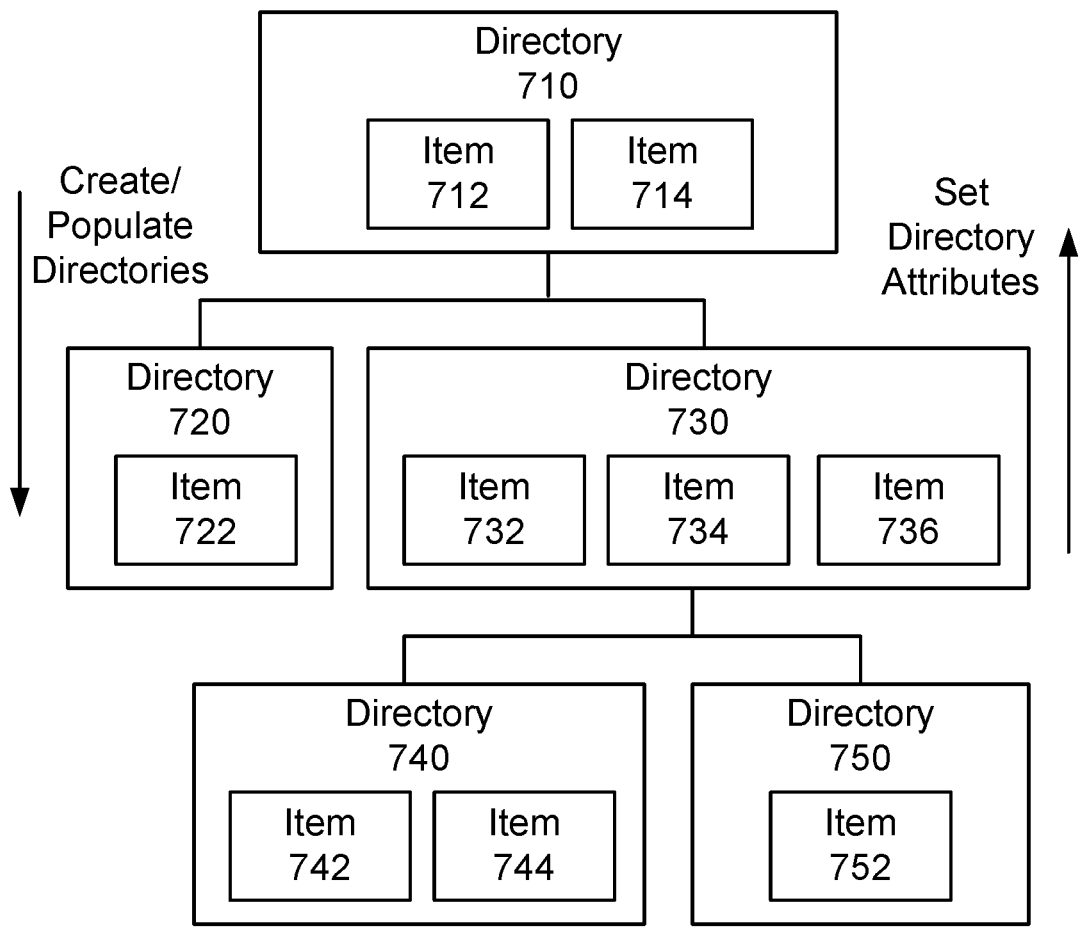
FIG. 7 illustrates an embodiment of specified content to be restored.

FIG. 7 is an exemplary embodiment of specified content 700 desired to be restored. Specified content 700 includes hierarchically organized items (directories). Directories 710, 720, 730, 740 and 750 are hierarchically organized. Directory 710 is the highest level (e.g. level 1) of the hierarchy. For example, a constant equal to a number greater than the number of levels in the hierarchy such as 1000 (one thousand) may be selected. In this case, directory 710 may have an attribute sort level of 1000−1=999. Directories 720 and 730 are subdirectories of directory 710 and thus the next highest level (level 2, attribute sort level 998) of the hierarchy. Directories 740 and 750 are subdirectories of directory 730 and thus the lowest (level 3, attribute sort level 997) level of the hierarchy. Directory 710 includes data items 712 and 714. Directory 720 includes data item 722. Directory 730 includes data items 732, 734 and 736. Directory 740 includes data items 742 and 744. Directory 750 includes data items 752. Specified content 700 may reside on cluster 108 and be desired to be restored to primary storage 102, cloud 101 or another location.

Method 600 may be used in restoring specified content 700. In this example, all of specified content 700 shown is to be restored to an empty target storage. At 602, directories 710, directories 720 and 730, and directories 740 and 750 are created in hierarchical order and populated. Thus, directory 710 is created before directories 720 and 730. Directory 730 is created before directories 740 and 750. In some embodiments, directory 720 is created before directories 740 and 750 because directory 720 is at a higher level of the hierarchy. In other embodiments, directory 720 may be created after directory 740 because the directories 720 and 740 are on different branches of the hierarchy of directories shown in FIG. 7. In such embodiments, directory 730 is still created before directories 740 and 750 because directories 730, 740 and 750 all lie along the same branch of the hierarchy. In some embodiments, non-hierarchically based attributes of directories 710, 720, 730, 740 and 750 may also be set at 602.

Also at 602, data items 712, 714, 722, 732, 734, 736, 742, 744 and 752 are provided to the target storage. Thus, data items 712, 714, 722, 732, 734, 736, 742, 744 and 752 are created in their corresponding directories, their data copied from the data source to the target storage. Some or all of their attributes may or may not be set. In some embodiments, providing data items 712, 714, 722, 732, 734, 736, 742, 744 and 752 is also performed in hierarchical order. Thus, data items 712 and 714 may be provided before data items 722, 732, 734, 736, 742, 744 and 752. Similarly, data items 722, 732, 734 and 736 may be provided before data items 742, 744 and 752. In some embodiments, the population of a directory's sub-directories may be allowed before the directory is fully populated. For example, some embodiments may permit item 722 to be created after item 742; this is not problematic because directory 720 is along a different branch of the hierarchy than directory 740. However, item 742 may not be created until all ancestor directories have been created (i.e. directories 710, 730, and 740). This may occur because the operations used in creating and populating the directories may be performed in parallel as discussed above with respect to method 500. For example, item 736 may be created before item 714 has its attributes set. Thus, the creation of directories 710, 720, 730, 740 and 750 are performed in hierarchical order. This is indicated by the downward arrow in FIG. 7. As part of creating and populating directories 710, 720, 730, 740 and 750 at 602, method 500 may be used to divide the tasks into task units, organize the task units into groups and process the groups in parallel. Thus, creating and populating directories 710, 720, 730, 740 and 750 may be performed in a parallel and in hierarchical order.

After the directories are created and fully populated in 602, including setting all of the data item attributes, at least the hierarchically-based attributes for the directories are set in reverse hierarchical order at 604. Thus, the hierarchically-based attributes for directories 740 and 750 are set before the hierarchically-based attributes for directory 730. Similarly, the hierarchically-based attributes for directories 720 and 730 are set before the hierarchically-based attributes for directory 710. In some embodiments, the hierarchically-based attributes for directories are set based on the level of the hierarchy. This may be accomplished using the attribute sort value as described above. For specified content 700, the total number of levels in the hierarchy is three (in this example, we select L=1000, which is much larger than the number of levels in the hierarchy, for simplicity). The first level for which attributes are set corresponds to the lowest level, level l=3 (j=L−l=1000−3=997). Thus, the hierarchically-based attributes for the lowest level directories 740 and 750 in the hierarchy are set first in such embodiments. In addition, the hierarchically-based attributes for directories 740 and 750 may be set in parallel. A mid-level attribute sort value corresponds to the second level in the hierarchy for specified content 700 (j=L−l=1000−2=998). Thus, hierarchically-based attributes for directory 730 are set after the hierarchically-based attributes of directories 740 and 750 are set. Although directory 720 could have its hierarchically-based attributes set in parallel with directories 740 and 750, when setting hierarchically-based attributes guided by the attribute sort value, directory 720 may have its hierarchically-based attributes set in parallel with other directories having the same attribute sort value, such as directory 730. The highest attribute sort value (j=999) corresponds to the highest level in the hierarchy, level 1 (j=L−l=1000−1=999). Thus, the hierarchically-based attributes for directory 710 are set last. In other embodiments, setting hierarchically-based attributes for different branches of the hierarchy may or may not be guided by the attribute sort value; however, the hierarchically-based attributes for a directory's subdirectory are always set before the hierarchically-based attributes of the directory. For example, in such an embodiment, the hierarchically-based attributes for directory 720 may be set before the hierarchically-based attributes for directory 740 and/or 750. However, the hierarchically-based attributes for directories 740 and 750 are set before the hierarchically-based attributes for directory 730. In addition, the hierarchically-based attributes for both directory 720 and 730 are set before the hierarchically-based attributes for directory 710 are set.

Using method 600, restoring the specified content may be improved. If method 600 is used in conjunction with 404 of method 400, the difference between the specified content and items present at the target storage is determined. Thus restoring items that are already present in the target storage may be avoided. Using method 600 in conjunction with method 500, distribution to different task groups and parallel operation may be achieved. Further, using method 600, restores of hierarchically organized directories and their contents may be achieved more efficiently. As a result, performance of restore operations may be improved. Further, method 600 may be extended to other analogous processes, including but not limited to replicating hierarchically organized directories and their contents from a data source to a target source. For example, method 600 may be used to copy directories and their contents from one location on primary storage system 102 to another location on primary storage system 102 or any other storage system.

Figure 8:
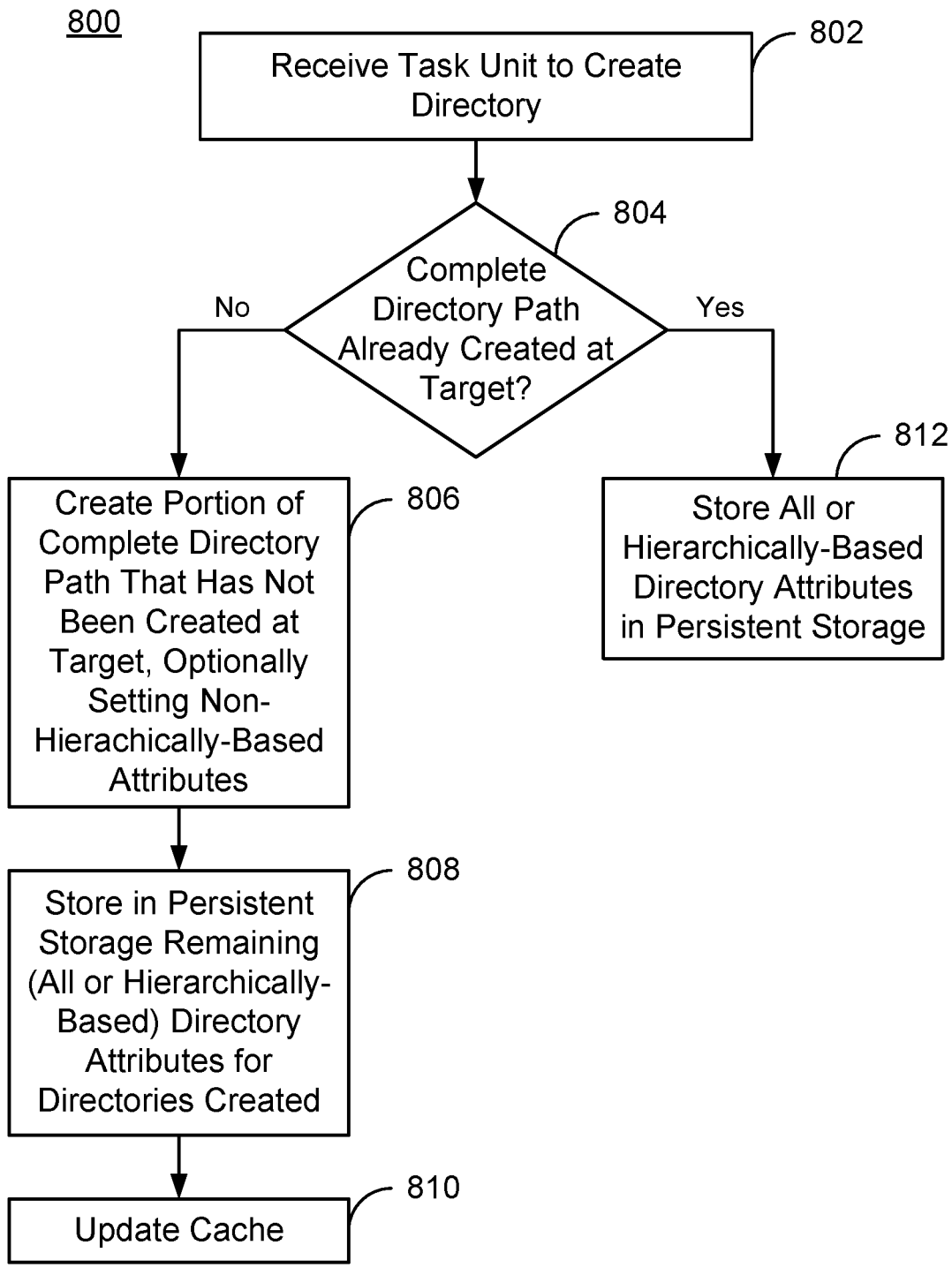
FIG. 8 is a flow chart depicting an embodiment of a method of performing task unit(s) for restoring data.

FIG. 8 is a flow chart depicting an embodiment of method 800 for performing task unit(s) used in restores. For example, method 800 may restore content from secondary storage 102 to primary storage 102 or cloud storage 101. In other embodiments, other data sources and/or target storage may be used. Method 800 commences after the specified content, including the data source of the specified content, has been identified. In addition, the target storage to which the content is to be restored is determined. Method 800 may be viewed as corresponding to a stream that may be one of many such streams operating in independently and in parallel to process task units of task groups. Thus, the task units for the restore have been determined and divided into task groups. The specified content to be restored may also include hierarchically organized directories.

Portions of method 800 may be performed in a different order than shown and may include sub-processes. Additional and/or other processes not inconsistent with the method and system described herein may also be performed. For example, method 800 may perform other and/or additional task units (e.g. other file system operations). In some embodiments, method 800 is performed using processor(s) executing instruction(s) stored in memory or another non-transitory computer-readable medium. For example, method

800 may be performed by file system manager 130 of FIG. 1. In some embodiments, other and/or additional component(s) may be used for process 800. In some embodiments, method 800 may be carried out by agent 132 or other software and/or hardware component(s) that may reside on primary storage 102. In some embodiments, method 800 may be used to perform at least part of method 400, method 500 and/or method 600. In other embodiments, method 800 may be used separately.

A "create directory" task unit is received for processing from its corresponding task group, at 802; for example, the "create directory" task unit may be included in a task group which is being processed. It is determined whether or not it is necessary to create one or more directories, at 804. Determining whether it is necessary to create one or more directories includes determining whether the complete directory path (all directories in a path to the directory being created) has been created. In some cases, it may not be necessary to create a parent directory, even though the task unit to be performed is a "create directory" task unit; this may be because the directory as well as some or all ancestor directories, may already have been created by one or more previously executed task units. In some embodiments, directories that have been created are identified in a cache. In such embodiments, 804 may include querying the cache to determine whether the desired directory is listed. In some embodiments, the directory or directories are iteratively created. For example, it may be determined at 804 whether the parent directory to the directory to be created has been created. If not, 804 is repeated for the grandparent. This iteration is repeated until an ancestor directory that has been created is found. Remaining portions of method 800 may then be performed to create all directories in the complete directory path.

If it is determined that one or more directories in the complete directory path have not been created yet, then the one or more directories are created, at 806. For example, the request to create the directory (or directories) is provided to the target storage. In response, the directory is created at the target storage. At 808, the directory path and some or all directory attributes (e.g. hierarchically-based and/or non-hierarchically-based attributes) are stored in persistent storage, which may reside on secondary storage system 102. For example, the path and some or all attributes may be stored on cluster 108. Thus, some or all of the attributes for the directory currently being created are available in the event of failure as well as for later use. In some embodiments, 808 includes storing some or all of the attributes and path in a key-value store. In some embodiments, the key may incorporate the attribute sort value described above. The some or all of the attributes for the directory may thus be available for setting in reverse hierarchical order once the directories have been created and populated. For example, the attributes may be available for 604 of method 600. In some embodiments, the persistent storage of 808 is distinct from the cache storing the identities of directories that have been created and may reside on node(s) 110 through 120. In some embodiments, non-hierarchically-based attributes are set in 602. In such embodiments, these attributes may or may not be stored in the persistent storage at 808. The cache storing the identities of directories that have been created is updated at 810. Consequently, the cache that is checked at 804 now includes the identity of the (new) directory that was created at 806. At some later time, the cache may be pruned. Thus, the directory may be evicted from the cache, for example because a time interval has expired or because the directory has been created and populated. If required, the directory can be re-added to the cache later.

If it is determined at 804 that the complete directory path has already been created, then one or more of the directories in the path may have been created as part of creating a data item. This situation is described with respect to method 900. In such a case, the attributes to be set in reverse hierarchical order may or may not have been stored in persistent storage. Thus, some attributes (some or all non-hierarchically-based attributes, some or all hierarchically-based attributes, or combinations thereof) may be stored in persistent storage, at 812.

Using method 800, restoring the specified content may be improved. If method 800 is used in conjunction with method 400, 500 and/or 600, the benefits of method 400, 500 and/or method 600 may be realized for method 800. Further, using method 800, restores of directories and their contents may be achieved more efficiently and failures of the system may be protected against. Checking whether a directory has already been created in method 800 improves efficiency. This process allows directories to be created in parallel with their data items instead of creating all of the directories first and then populating the directories with data items. Furthermore, because directory creation is checked, it is not necessary to carefully order all the directory creation tasks before execution, simplifying parallelization. Creating a full directory hierarchy before populating any directories may result in a significant delay in the restore. Consequently, method 800 may provide a significant reduction in time required to perform the restore. Storing some or all of the directories' attributes in persistent storage may allow this information to be available later even if the system fails. As a result, performance of restore operations may be improved.

Figure 9:
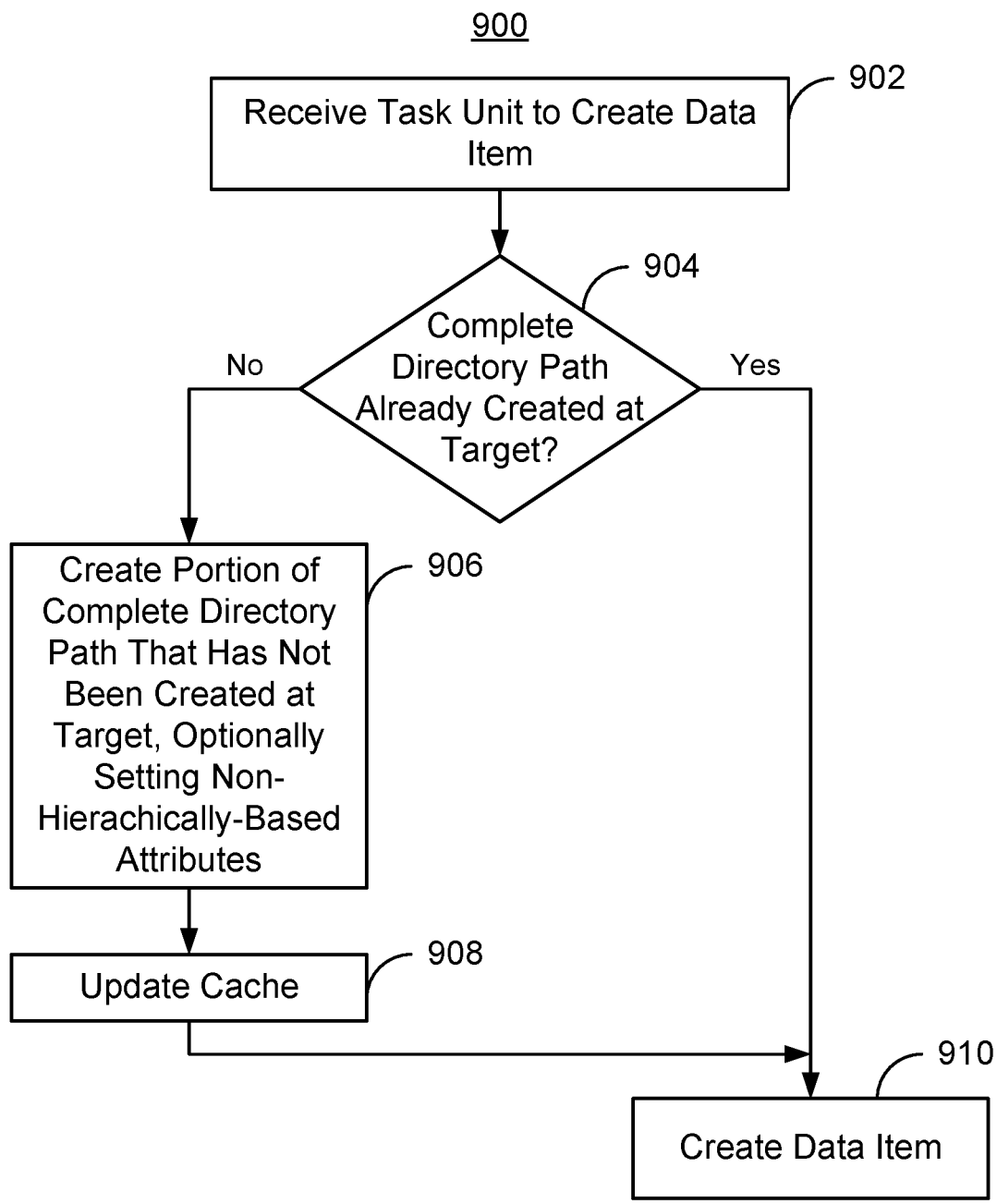
FIG. 9 is a flow chart depicting an embodiment of a method of performing task unit(s) for restoring data.

FIG. 9 is a flow chart depicting an embodiment of method 900 for performing task unit(s) used in restores. For example, method 900 may restore content from secondary storage 102 to primary storage 102 or cloud storage 101. In other embodiments, other data sources and/or target storage may be used. Method 900 commences after the specified content, including the data source of the specified content, has been identified. In addition, the target storage to which the content is to be restored is determined. Method 900 may be viewed as corresponding to a stream that may be one of many such streams operating in independently and in parallel to process task units of task groups. Thus, the task units for the restore have been determined and divided into task groups. The specified content to be restored may also include hierarchically organized directories.

Portions of method 900 may be performed in a different order than shown and may include sub-processes. Additional and/or other processes not inconsistent with the method and system described herein may also be performed. For example, method 900 may perform other and/or additional task units (e.g. other file system operations). In some embodiments, method 900 is performed using processor(s) executing instruction(s) stored in memory or another non-transitory computer-readable medium. For example, method 900 may be performed by file system manager 130 of FIG. 1. In some embodiments, other and/or additional component(s) may be used for process 800. In some embodiments, method 900 may be carried out by agent 132 or other software and/or hardware component(s) that may reside on primary storage 102. In some embodiments, method 800 may be used to perform at least part of method 400, method 500 and/or method 600. In other embodiments, method 900 may be used separately.

A "create data item" task unit is received from its corresponding task group for processing, at 902. It is determined whether or not it is necessary to create one or more directories before creating the data item, at 904. For example, determining whether or not it is necessary to create one or more directories can include determining whether the complete directory path (all directories in a path to the data item being created) has been created. In some cases, it may not be necessary to create a directory. This may be because the data item's parent directory, as well as all of its ancestor directories, may have been created by one or more previously executed task units. In some embodiments, directories that have been created are identified in a cache. In such embodiments, 904 may include querying the cache to determine whether the desired directory is listed. In some embodiments, the directory or directories are iteratively created. For example, it may be determined at 904 whether the data item's parent has been created. If not, at 904 the process of checking if the data item's grandparent has been created is repeated. The data item's directory path is checked until a directory that has been created is found. Remaining portions of method 900 may then be performed to ensure creation of directories in the complete directory path.

If it is determined that one or more directories in the complete directory path to the data item have not been created yet, then the one or more directories are created, at 906. For example, the request to create the ancestor directory (or directories) is provided to the target storage. In response, the ancestor directory (or directories) is created at the target storage. Some or all non-hierarchically-based attributes may or may not be set at 906. The cache storing the identities of directories that have been created is updated at 908. Consequently, the cache that is checked at 904 now includes the identity of the (new) directory (or identities of the new directories) that was created at 906. At some later time, the cache may be pruned. Thus, the directory may be evicted from the cache, for example because a time interval has expired or because the directory has been created and populated. If required, the directory can be re-added to the cache later. In this embodiment, attributes of the directory created at 906 may or may not be stored in persistent storage. The data item is then created at 910. If it is determined at 904 that the complete directory path has already been created, then the data item is created, at 910.

Using method 900, restoring the specified content may be improved. If method 900 is used in conjunction with method 400, 500 and/or 600, the benefits of method 400, 500 and/or method 600 may be realized for method 900. Further, using method 900, restores of directories and their contents may be achieved more efficiently and failures of the system may be protected against. Allowing directories to be created for data items being restored in parallel with their directory and checking whether a directory has already been created in method 900 improves efficiency. This process allows directories to be created in parallel with their data items instead of creating all of the directories first and then populating the directories with data items. Creating a full directory hierarchy before creating any data items such as files, may result in a significant delay in the restore. Consequently, method 900 may provide a significant reduction in time required to perform the restore.

Thus, methods 400, 500, 600, 800 and 900 each improve efficiency of the restore process. Moreover, methods 400, 500, 600, 800 and 900 need not be performed together as a part of the same restore process. However, a restore process utilizing some combination of methods 400, 500, 600, 800 and 900 may be greatly streamlined and result in a significant improvement in performance of restore operations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
  receiving a specification of content to be restored to a target storage from a data source, wherein the content to be restored includes a plurality of directories having an hierarchical order;
  determining task units to be performed to restore the specified content, wherein each task unit of the task units is associated with a corresponding assigned weight value, wherein the corresponding assigned weight value indicates an expected amount of time to perform a particular task unit;
  based on the corresponding assigned weight values, distributing the task units to a plurality of different task groups that are processed in parallel with each other to concurrently perform at least a portion of the distributed task units; and
  processing the plurality of different task groups in parallel, comprising:
    providing a first plurality of requests to create and populate the plurality of directories on the target storage; and
    providing a second plurality of requests to set at least one corresponding attribute for each of the plurality of directories in a reverse hierarchical order after the plurality of directories on the target storage has been created and populated, comprising:
  determining whether a complete directory path to a directory of the plurality of directories has been created at the target storage; and
  in response to a determination that the complete directory path to the directory of the plurality of directories has not been created at the target storage:
    creating one or more directories of the complete directory path that has not been created; and
    storing attributes of the one or more created directories in persistent storage associated with the data source.

2. The method of claim 1, wherein the plurality of directories on the target storage are created on the target storage in the hierarchical order.

3. The method of claim 1, wherein at least one directory of the plurality of directories is created at the target storage, wherein creating at least one directory of the plurality of directories includes determining whether the at least one directory has been already created.

4. The method of claim 3, wherein determining whether the at least one directory has been created includes searching a cache associated with the data source for an indication that the at least one directory has been created.

5. The method of claim 1, further comprising storing the at least one corresponding attribute for each directory of the plurality of directories in the persistent storage associated with the data source; setting the at least one attribute including by obtaining the at least one corresponding attribute for each directory of the plurality of directories from the persistent storage.

6. The method of claim 1, wherein the corresponding assigned weight value for each of the task units is based on an estimated amount of processing resource to perform the task unit.

7. The method of claim 1, further comprising determining at least one difference between the target storage and the data source.

8. A system for restoring content, comprising:
  a processor configured to:
    receive a specification of content to be restored to a target storage from a data source, wherein the content to be restored includes a plurality of directories having an hierarchical order;
    determine task units to be performed to restore the specified content, wherein each task unit of the task units is associated with a corresponding assigned weight value,
  wherein the corresponding assigned weight value indicates an expected amount of time to perform a particular task unit;
    based on the corresponding assigned weight values, distribute the task units to a plurality of different task groups that are processed in parallel with each other to concurrently perform at least a portion of the distributed task units; and
    process the plurality of different task groups in parallel, comprising to:
      provide a first plurality of requests to create and populate the plurality of directories on the target storage; and
      provide a second plurality of requests to set at least one corresponding attribute for each of the plurality of directories in a reverse hierarchical order after the plurality of directories on the target storage has been created and populated, comprising to:
        determine whether a complete directory path to a directory of the plurality of directories has been created at the target storage; and
        in response to a determination that the complete directory path to the directory of the plurality of directories has not been created at the target storage:
          create one or more directories of the complete directory path that has not been created; and
          store attributes of the one or more created directories in persistent storage associated with the data source; and
  a memory coupled to the processor and configured to provide the processor with instructions.

9. The system of claim 8, wherein the plurality of directories on the target storage are created on the target storage in the hierarchical order.

10. The system of claim 8, wherein the processor is further configured to create and populate at least one of the plurality of directories, wherein to create and populate at least one of the plurality of directories, the processor is configured to determine whether the at least one of the plurality of directories has been already created.

11. The system of claim 10, wherein to determine whether the at least one directory has been created, the processor is further configured to search a cache associated with a system of the data source for an indication that the at least one directory has been created.

12. The system of claim 8, wherein the processor is further configured to:
  store the at least one corresponding attribute for each directory of the plurality of directories in the persistent storage associated with a system of the data source; and
  set the at least one corresponding attribute, wherein to set the at least one corresponding attribute, the processor is further configured to obtain the at least one corresponding attribute for each directory of the plurality of directories from the persistent storage.

13. The system of claim 8 wherein the corresponding assigned weight value for each of the task units is based on an estimated processing capacity for performing the task unit.

14. The system of claim 8, wherein the processor is further configured to determine at least one difference between the target storage and the data source.

15. A computer program product for restoring content, the computer program product being embodied in a non-transitory computer readable storage medium and comprising computer instructions for:
  receiving a specification of the content to be restored to a target storage from a data source, wherein the content to be restored includes a plurality of directories having an hierarchical order;
  determining task units to be performed to restore the specified content, wherein each task unit of the task units is associated with a corresponding assigned weight value, wherein the corresponding assigned weight value indicates an expected amount of time to perform a particular task unit;
  based on the corresponding assigned weight values, distributing the task units to a plurality of different task groups that are processed in parallel with each other to concurrently perform at least a portion of the distributed task units; and processing the plurality of different task groups in parallel, comprising:
   providing a first plurality of requests to create and populate the plurality of directories on the target storage; and
   providing a second plurality of requests to set at least one corresponding attribute for each of the plurality of directories in a reverse hierarchical order after the plurality of directories on the target storage has been created and populated, comprising:
      determining whether a complete directory path to a directory of the plurality of directories has been created at the target storage; and
      in response to a determination that the complete directory path to the directory of the plurality of directories has not been created at the target storage:
         creating one or more directories of the complete directory path that has not been created; and
         storing attributes of the one or more created directories in persistent storage associated with the data source.

* * * * *